(12) United States Patent
Tsujii et al.

(10) Patent No.: US 7,624,139 B2
(45) Date of Patent: Nov. 24, 2009

(54) INFORMATION PROCESSING APPARATUS, METHOD OF CONTROLLING THE SAME, INFORMATION PROCESSING SYSTEM, AND COMPUTER-READABLE MEMORY

(75) Inventors: Osamu Tsujii, Tochigi (JP); Makoto Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1407 days.

(21) Appl. No.: 10/000,485

(22) Filed: Dec. 4, 2001

(65) Prior Publication Data

US 2002/0099853 A1    Jul. 25, 2002

(30) Foreign Application Priority Data

Dec. 6, 2000    (JP) .............................. 2000-371722

(51) Int. Cl.
*G06F 15/16*    (2006.01)
(52) U.S. Cl. .................. 709/200; 709/231; 709/247
(58) Field of Classification Search ............... 709/247, 709/200, 203, 231; 345/204, 211, 213, 214, 345/201, 660, 668–673, 698–699
See application file for complete search history.

(56) References Cited

U.S. PATENT DOCUMENTS 4,258,264 A    3/1981    Kotera et al. ................ 250/484
5,687,396 A    11/1997    Satoh et al. .................. 395/872
5,729,708 A    3/1998    Satoh et al. .................. 395/250
5,822,541 A *  10/1998    Nonomura et al. .......... 709/247
6,081,251 A *  6/2000    Sakai et al. .................. 345/670
6,281,874 B1 *  8/2001    Sivan et al. .................. 345/660
6,345,307 B1 *  2/2002    Booth ......................... 709/247
6,438,610 B1 *  8/2002    Pearson et al. .............. 709/247
6,492,982 B1 *  12/2002   Matsuzaki et al. .......... 345/204
6,496,868 B2 *  12/2002   Krueger et al. .............. 709/247
6,839,068 B2 *  1/2005    Yoshioka ..................... 345/670

FOREIGN PATENT DOCUMENTS

JP    55-012429    1/1980
JP    56-011395    2/1981

* cited by examiner

*Primary Examiner*—Saleh Najjar
*Assistant Examiner*—Faruk Hamza
(74) *Attorney, Agent, or Firm*—Fitzpatrick, Cella, Harper & Scinto

(57) ABSTRACT

In order to reduce the size of a data stream of image data transmitted via a network and to efficiently manage such a data stream, the image data is coded in a highly efficient fashion using a hierarchical coding algorithm, such as a wavelet transformation. When a data stream is being inputted, the data stream is analyzed and input of the data stream is interrupted in accordance with an analysis result. An interrupted stream is generated from the data stream that has already been inputted. The resultant interrupted stream is stored.

13 Claims, 20 Drawing Sheets

FIG. 6A
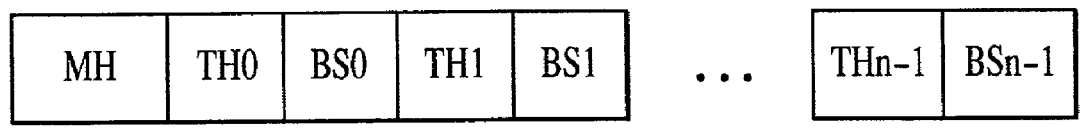
FIG. 6B
| IMAGE SIZE | TILE SIZE | NUMBER OF COMPONENTS | COMPONENT INFORMATION |
|---|---|---|---|
FIG. 6C
| TILE LENGTH | CODING PARAMETERS |
|---|---|
FIG. 6D
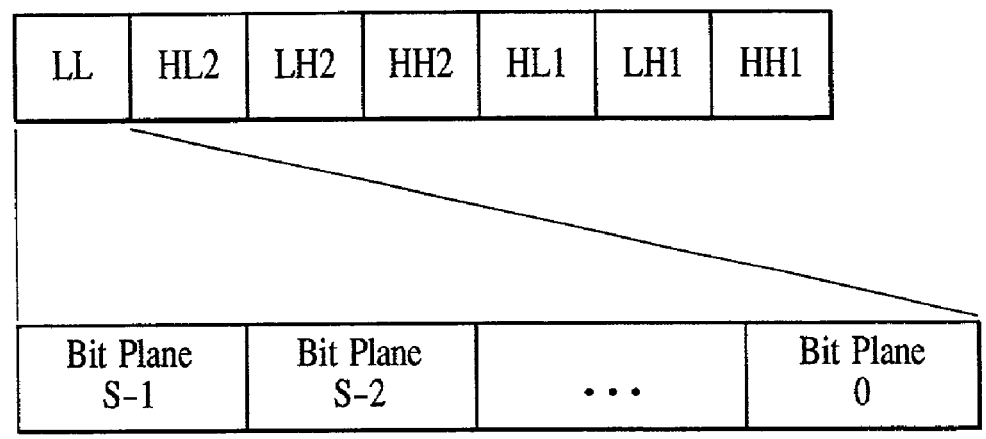

FIG. 7A

| MH | TH0 | BS0 | TH1 | BS1 | ... | THn-1 | BSn-1 |

FIG. 7B

| IMAGE SIZE | TILE SIZE | NUMBER OF COMPONENTS | COMPONENT INFORMATION |

FIG. 7C

| TILE LENGTH | CODING PARAMETER |

FIG. 7D

| HL2 | LH2 | LL | ... | LL | HL2 | LH2 | HH2 | HL1 | LH1 | HH1 |

Bit Plane S-1 | Bit Plane S-2 | Bit Plane 0

FIG. 12A
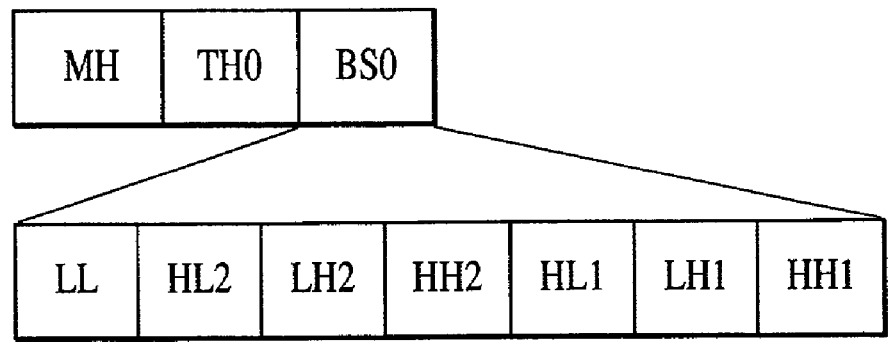
FIG. 12B
   = LL
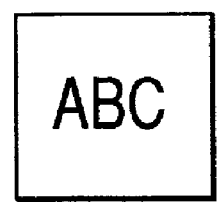   = LL+HL2+LH2+HH2
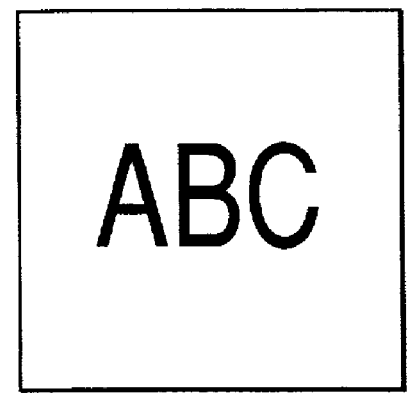   = LL+HL2+LH2+HH2+HL1+LH1+HH1

INFORMATION PROCESSING APPARATUS, METHOD OF CONTROLLING THE SAME, INFORMATION PROCESSING SYSTEM, AND COMPUTER-READABLE MEMORY

BACKGROUND OF THE INVENTION

1. Field of the Invention

The present invention relates to an information processing apparatus capable of transmitting/receiving a data stream via a network, a method of controlling such an information processing apparatus, an information processing system, and a computer-readable memory.

2. Description of the Related Art

If a certain kind of fluorescent substance is irradiated with a radiation (such as X-rays, alpha rays, beta rays, gamma rays, electron rays, or ultraviolet rays), the energy of the radiation is partially stored in the fluorescent substance. If this fluorescent substance is excited by light, such as visible light, the fluorescent substance emits stimulated fluorescent light depending upon the stored energy. This type of fluorescent substance is called a storage fluorescent substance (stimulated fluorescent substance). It is known to temporarily record a radiation image of a subject such as a human body on a storage fluorescent sheet and obtain an image signal by illuminating the storage fluorescent sheet with stimulation light such a laser beam, so as to generate stimulated fluorescent light and opto-electronically read the generated light.

Japanese Patents Laid-Open Nos. 55-12429 and 56-11395 disclose a radiation image recording/reproducing system in which a radiation image of a subject is output in the form of a visible image on a recording medium, such as a photographic recording medium, or on a display, such as a CRT, in accordance with an image signal obtained from stimulated fluorescent light.

In recent years, there has been developed an apparatus for acquiring a visible image from an X-ray image using a semiconductor sensor. Such systems have the advantage that an image can be formed over a very wide exposure range compared with a conventional radiation photography system based on the silver halide photography. More specifically, X-rays are detected by an optical-to-electric signal converter over a very wide dynamic range and a corresponding electrical signal is output. A visible image corresponding to the radiation image is formed on a recording medium such as a photographic recording medium or on a display such as a CRT in accordance with the electrical signal. This makes it possible to obtain a radiation image without encountering a problem caused by a variation in exposure.

When an image is stored or transmitted, the data size of the image is reduced by means of high-efficiency coding. More specifically, the data size of the image is reduced by removing redundancy in the image or changing the content of the image within a range in which significant visible degradation does not occur.

According to the JPEG standard, which has been recommended by ISO and ITU-T as an international standard for coding a still image, differential pulse code modulation (DPCM) is employed for reversible compression, and discrete cosine transform (DCT) is employed for irreversible compression. For detailed information about the JPEG standard, refer to the ITU-T recommendation T.81 ISOIEC 10918-1.

In recent years, a compression method using a discrete wavelet transform (DWT) has been developed. This method is known as JPEG2000. In contrast to the compression method such as the JPEG compression method based on the DCT, the compression method based on the DWT has the advantage that blocking artifacts do not occur.

In medical applications, images are needed to be stored as a medical care record in the form of a lossless data for a certain period of time. To meet such a requirement, the JPEG2000 method supports lossless coding based on the DWT. However, although this lossless coding technique has the advantage that an image having certain image quality can be formed from a starting part of a file, the problem is that the compression ratio is as low as about 1:3.

In a computer network environment, although the processing capacity and the storage capacity of a computer can be easily improved, a network having a low transmission rate results in a great reduction in the overall processing capacity of the system. If there is only one such a low-speed network, this network can cause a bottleneck.

SUMMARY OF THE INVENTION

In view of the above, it is an object of the present invention to provide a technique of efficiently managing a data stream, such as a compressed image data, so as to reduce the amount of data transmitted via a network.

More specifically, it is an object of the present invention to provide a technique of transmitting coded image data using a hierarchical coding algorithm such as a wavelet transform.

According to an aspect of the present invention, in order to achieve the above objects, there is provided an information processing apparatus for processing a data stream inputted via a network, comprising: input means for inputting a data stream via the network; analyzing means for analyzing the data stream inputted via the input means; generating means for, in accordance with an analysis result made by the analyzing means, interrupting input of the data stream performed by the input means and generating an interrupted stream from the data stream; and storing means for storing the interrupted stream generated by the generating means, wherein in the analysis, at least one of a compression ratio, a signal-to-noise ratio, an amount of data, and a number of layers of the data stream is employed as an analysis condition.

According to another aspect of the present invention, there is provided an information processing apparatus for processing a data stream inputted via a network, comprising: input means for inputting a data stream via the network; interrupted-stream storage unit for storing an interrupted stream generated by interrupting the data stream; interrupt information storing means for storing interrupt information associated with the interrupted stream; and output unit for outputting the interrupted stream stored in the interrupted-stream storage unit, in response to a request for outputting the data stream, wherein the interrupt information is at least one of a compression ratio, a signal-to-noise ratio, an amount of data, and a number of layers of the data stream.

According to still another aspect of the present invention, there is provided an information processing apparatus for processing a data stream inputted via a network, comprising: input means for inputting a data stream via the network; analyzing means for analyzing the data stream inputted via the input means; generating means for, in accordance with an analysis result made by the analyzing means, interrupting input of the data stream via the input means and generating an interrupted stream from the data stream; interrupted-stream storage unit for storing the interrupted stream generated by the generating means; interrupt information storing means for storing interrupt information associated with the interrupted stream; and output unit for outputting the interrupted stream and the interrupt information to an external apparatus connected to the network, wherein in the analysis, at least one of a compression ratio, a signal-to-noise ratio, an amount of data, and a number of layers of the data stream is employed as an analysis condition.

According to yet another aspect of the present invention, there is provided an information processing system including a management terminal for managing data streams and a terminal for issuing a request for outputting a data stream, the terminal and the management terminal being connected to each other via a network, wherein the management terminal comprises: a database for storing data streams; and output unit for acquiring a specified data stream from the database in accordance with a request for outputting the data stream issued by the terminal and outputting the data stream to the terminal via the network, and wherein the terminal comprises: issuing means for issuing a request for outputting a data stream; input means for inputting the requested data stream from the management terminal via the network; analyzing means for analyzing the data stream inputted via the input means; generating means for, in accordance with an analysis result made by the analyzing means, interrupting input of the data stream by the input means and generating an interrupted stream from the data stream; and interrupted-stream storage unit for storing the interrupted stream generated by the generating means, and wherein in the analysis, at least one of a compression ratio, a signal-to-noise ratio, an amount of data, and a number of layers of the data stream is employed as an analysis condition.

According to still another aspect of the present invention, there is provided an information processing system including a management terminal for managing data streams, a first terminal connected to the management terminal via a first network, and a second terminal connected to the first terminal via a second network, wherein the management terminal comprises: a database for storing data streams; and output unit for acquiring a specified data stream from the database in accordance with a request for outputting the data stream issued by the first terminal and transferred to the management terminal, and outputting the data stream to the terminal via the network, wherein the first terminal comprises: first transferring means for transferring a request for outputting a data stream issued by the second terminal to the management terminal via the first network; and second transferring means for transferring the data stream received from the management terminal via the first network to the second terminal via the second network, and wherein the second terminal comprises: issuing means for issuing a request for outputting a data stream; input means for inputting the requested data stream from the first terminal via the second network; analyzing means for analyzing the data stream inputted via the input means; generating means for, in accordance with an analysis result made by the analyzing means, interrupting input of the data stream by the input means and generating an interrupted stream from the data stream; and interrupted-stream storage unit for storing the interrupted stream generated by the generating means, and wherein in the analysis, at least one of a compression ratio, a signal-to-noise ratio, an amount of data, and a number of layers of the data stream is employed as an analysis condition.

According to yet another aspect of the present invention, there is provided an information processing system including a management terminal for managing data streams, a first terminal connected to the management terminal via a first network, and a second terminal connected to the first terminal via a second network, wherein the management terminal comprises: a database storing data streams; output unit for acquiring a specified data stream from the database in accordance with a request for outputting the data stream issued by the first terminal and transferred to the management terminal, and outputting the data stream to the terminal via the network, wherein the first terminal comprises: transferring means for transferring a request for outputting a data stream issued by the second terminal to the management terminal via the first network; analyzing means for analyzing the data stream received from the management terminal via the first network; generating means for, in accordance with an analysis result made by the analyzing means, interrupting input of the data stream by the input means and generating an interrupted stream from the data stream; and first transferring means for transferring the interrupted stream to the second terminal via the second network, and wherein the second terminal comprises: issuing means for issuing a request for outputting a data stream; input means for inputting the requested data stream from the first terminal via the second network; and interrupted-stream storage unit for storing the interrupted stream inputted via the input means, and wherein in the analysis, at least one of a compression ratio, a signal-to-noise ratio, an amount of data, and a number of layers of the data stream is employed as an analysis condition.

According to still another aspect of the present invention, there is provided an information processing system including a first terminal for managing data streams and a second terminal for issuing a request for outputting a data stream, the first and second terminals being connected to each other via a network, wherein the first terminal comprises: a database storing data streams; analyzing means for acquiring a specified data stream from the database in accordance with a request for outputting the data stream issued by the second terminal and analyzing the data stream; generating means for generating an interrupted stream from the data stream in accordance with an analysis result made by the analyzing means; and output unit for outputting the interrupted stream to the second terminal via the network, and wherein the second terminal comprises: issuing means for issuing a request for outputting a data stream; input means for inputting the requested data stream from the first terminal via the network; and interrupted-stream storage unit for storing the interrupted stream inputted via the input means, and wherein in the analysis, at least one of a compression ratio, a signal-to-noise ratio, an amount of data, and a number of layers of the data stream is employed as an analysis condition.

According to yet another aspect of the present invention, there is provided an information processing system including a first terminal for managing data streams and a second terminal for issuing a request for outputting a data stream, the first and second terminals being connected to each other via a network, wherein the first terminal comprises: a database for storing data streams; and interrupted-stream storage unit for storing an interrupted stream generated by interrupting the data stream inputted from the second terminal via the network, and wherein the second terminal comprises: input means for inputting a data stream from the first terminal via the network; analyzing means for analyzing the data stream inputted via the input means; generating means for, in accordance with an analysis result made by the analyzing means, interrupting input of the data stream by the input means and generating an interrupted stream from the data stream; interrupted-stream storage unit for storing the interrupted stream generated by the generating means; interrupt information storing means for storing interrupt information associated with the interrupted stream; and output unit for outputting the interrupted stream and the interrupt information to the first terminal via the network, and wherein in the analysis, at least one of a compression ratio, a signal-to-noise ratio, an amount of data, and a number of layers of the data stream is employed as an analysis condition.

According to still another aspect of the present invention, there is provided an information processing system including a first terminal for managing data streams and a second terminal for issuing a request for outputting a data stream, the first and second terminals being connected to each other via a network, wherein the first terminal comprises: a database storing data streams; analyzing means for acquiring a specified data stream from the database in accordance with a request for outputting the data stream issued by the first terminal and analyzing the data stream; generating means for generating an interrupted stream from the data stream in accordance with an analysis result made by the analyzing means; interrupted-stream storage unit for storing the interrupted stream generated by the generating means; and output unit for outputting the interrupted stream to the second terminal via the network, and wherein the second terminal comprises: issuing means for issuing a request for outputting a data stream; and input means for inputting the requested data stream from the first terminal via the network, and wherein in the analysis, at least one of a compression ratio, a signal-to-noise ratio, an amount of data, and a number of layers of the data stream is employed as an analysis condition.

Further objects, features and advantages of the present invention will become apparatus from the following description of the preferred embodiments with reference to the attached drawings.

BRIEF DESCRIPTION OF THE DRAWINGS

FIGS. 6A to 6D are schematic diagrams illustrating sequences of codes obtained via resolution-scalable coding.

FIGS. 7A to 7D are schematic diagrams illustrating sequences of codes obtained via SNR-scalable coding.

FIGS. 12A and 12B are schematic diagrams illustrating sequences of codes and images, respectively, obtained via resolution-scalable decoding.

DESCRIPTION OF THE PREFERRED EMBODIMENTS

The present invention is described in further detail below with reference to two preferred embodiments. In a first embodiment, an image processing apparatus caches an interrupted file during a process in which an image is read. A cache server for caching interrupted files is disposed in the middle of a network via which the image processing apparatus and an image server are connected to each other. In a second embodiment, an interrupted file generated by an image processing apparatus A is written in a storage area of an image processing apparatus B.

In the first and second embodiments, by way of example but not limitation, the image processing system manages and displays radiation images, such as an X-ray image, a CT (Computer Tomograph) image, or an MRI (Magnetic Resonance Imaging) image. Note that the present invention may also be applied to other types of apparatuses, such as an office device or a consumer device for managing/displaying images.

Before describing the embodiments of the present invention, a technique of coding and decoding an image using the DWT is described. In the first and second embodiments described below, it is assumed that coding is performed in a lossless fashion. However, the present invention may also be applied to lossy coding. For example, the present invention discloses a technique of deleting an end portion of a lossless-coded image data file. A file produced as a result of such deletion is a lossy file. The coding and decoding based on the DWT described below can be applied to an image file regardless of whether the image file is lossless or lossy.

First, an image coding apparatus and an image decoding apparatus that may be used in the first and second embodiments are described.

Figure 1:
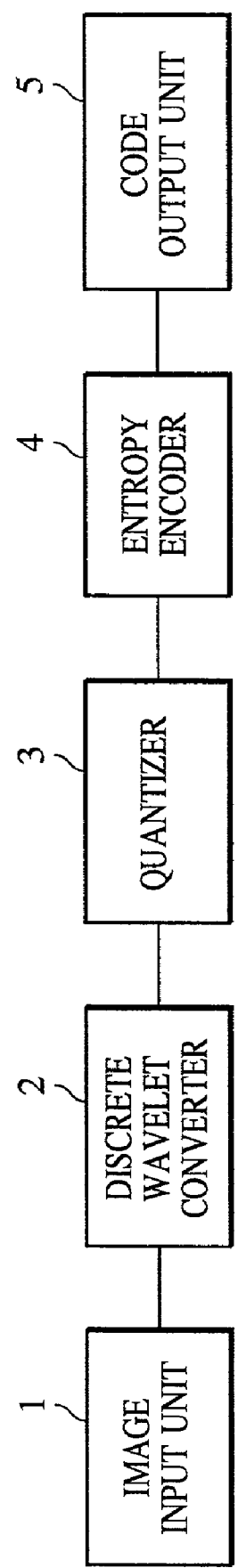
FIG. 1 is a block diagram of an image coding apparatus.

FIG. 1 is a block diagram illustrating an image coding apparatus.

As shown in FIG. 1, the image coding apparatus includes an image input unit 1, a discrete wavelet transform unit (converter) 2, a quantizer 3, an entropy coding unit 4, and a code output unit 5.

First, image data to be coded is inputted via the image input unit 1 on a line-by-line basis in the order in which the entire image data is raster-scanned. The inputted image data is applied to the discrete wavelet transform unit 2. In the following description, it is assumed that the image data to be coded is of a monochrome multi-level image, by way of example but not limitation. For example, in the case where a color image including a plurality of color components is coded, each of the RGB components or each of the luminance and chromaticity components may be compression-coded in a similar manner to that in which a monochrome multi-level image is compression-coded.

In the case of a medical apparatus, the image input unit 1 may be a film scanner, an X-ray digital image apparatus, an X-ray CT, an MRI, or an ultrasonic diagnostic apparatus.

When image data is inputted to the discrete wavelet transform unit 2, the discrete wavelet transform unit 2 performs a two-dimensional discrete wavelet transformation on the inputted image data and outputs calculated transform coefficients, as is known in the art.

The basic structure of the discrete wavelet transform unit 2 is briefly described below with reference to FIG. 2.

Figure 2:
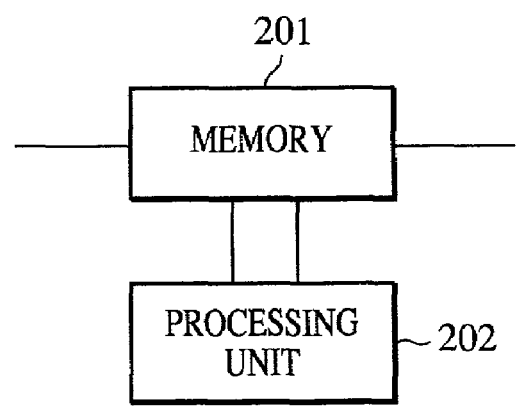
FIG. 2 is a block diagram illustrating a basic structure of a discrete wavelet transform unit.

FIG. 2 is a block diagram illustrating the basic structure of the discrete wavelet transform unit 2.

In FIG. 2, inputted image data is stored in a memory 201. A processing unit 202 reads the image data from the memory 201 and performs a conversion on the image data. The resultant data is again written in the memory 201.

The detailed structure of the processing unit 202 is described below with reference to FIG. 3.

Figure 3:
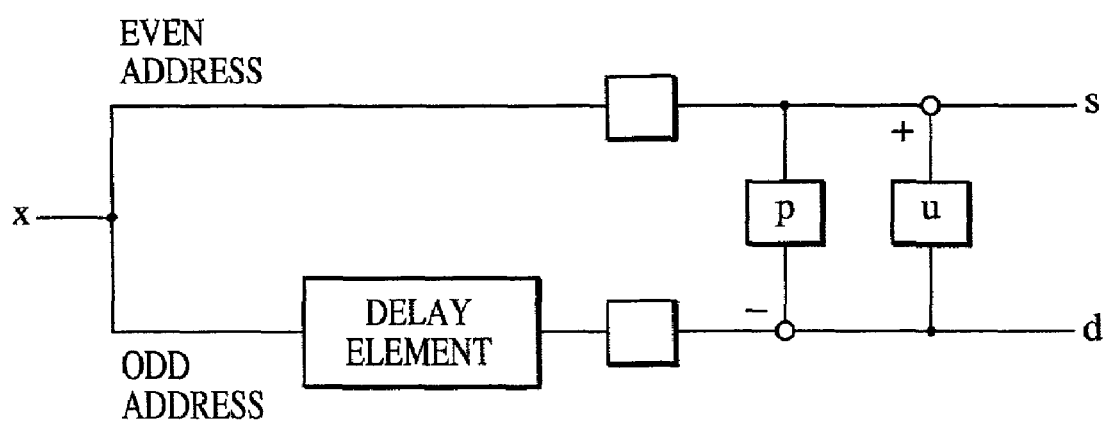
FIG. 3 is a block diagram illustrating the details of a processing unit.

FIG. 3 is a block diagram illustrating the details of the processing unit 202.

In FIG. 3, inputted image data x is separated by a combination of a delay unit and down samplers into even-numbered address data and odd-numbered address data. The resultant even-numbered address data and odd-numbered address data are then passed through two respective filters p and u. In FIG. 3, s and d denote a low-pass coefficient and a high-pass coefficient, respectively, obtained when one-level expansion is performed on one-dimensional image data. More specifically, s and d are calculated in accordance with the following equations:

$$d(n) = x(2n+1) - floor((x(2n) + x(2n+2))/2) \quad (1)$$

$$s(n) = x(2n) + floor((d(n-1) + d(n))/4) \quad (2)$$

In the above equations, x(n) is image data to be converted, and floor(X) represents an integer that is the greatest of those equal to or smaller than X.

In the above-described manner, the one-dimensional discrete-wavelet transformation is performed on image data. Two-dimensional discrete-wavelet transformation can be performed by sequentially performing a one-dimensional discrete-wavelet transformation on image data in horizontal and vertical directions. This technique is well known in the art, and thus a further detailed description is not given herein.

Now, two-level transform coefficients obtained as a result of a two-dimensional wavelet transform are described with reference to FIG. 4.

Figure 4:
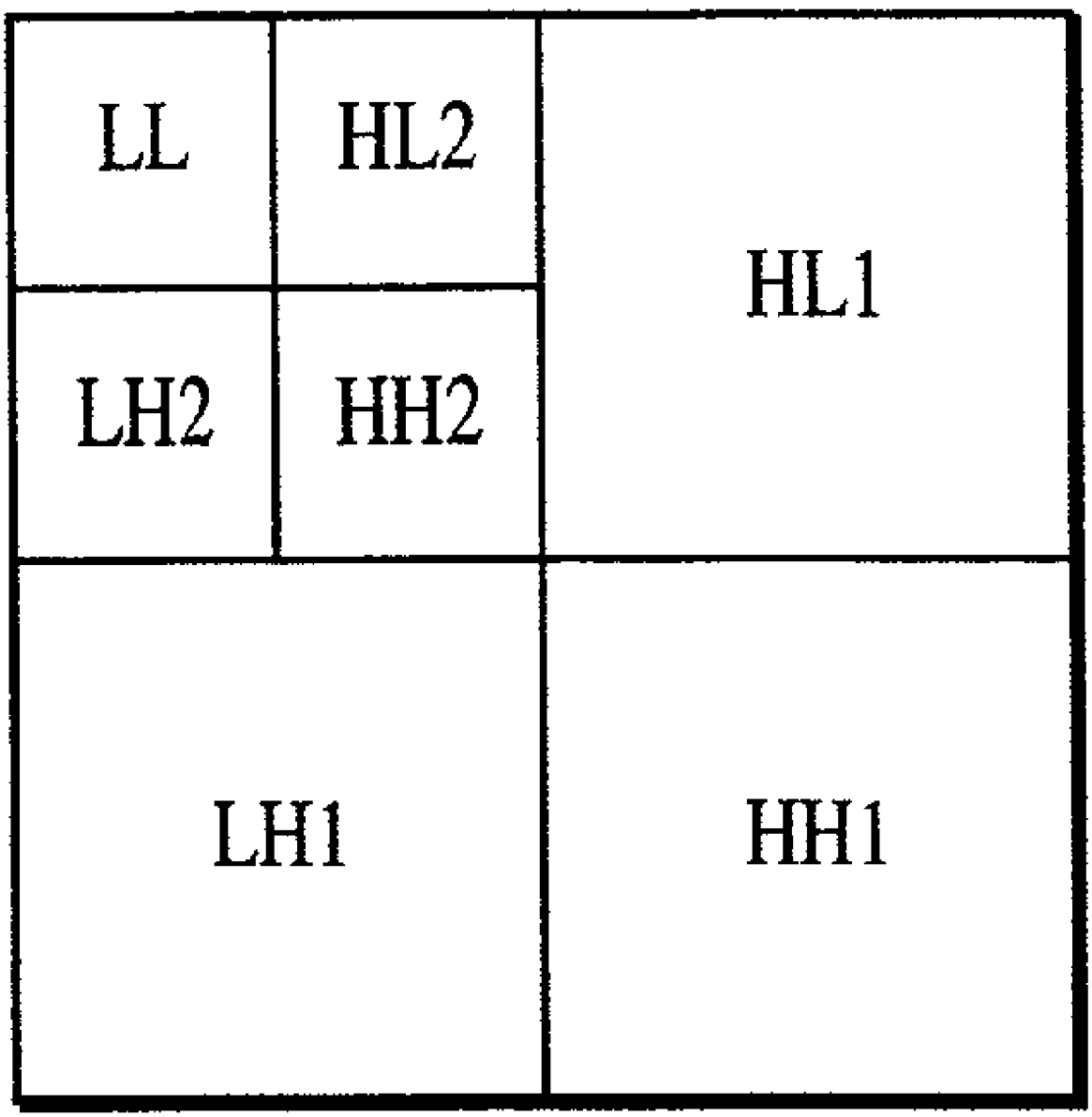
FIG. 4 is a schematic diagram illustrating an example of a set of two-level transform coefficients.

FIG. 4 is a schematic diagram illustrating an example of a set of two-level transform coefficients.

Image data is expanded into a sequence of coefficients HH1, HL1, . . . , LL in different frequency bands. In the following description, each coefficient is referred to as a subband. The sequence of coefficients is outputted on a subband-by-subband basis to a quantizer 3 (FIG. 1). However, in the case where coding is performed on a SNR (signal-to-noise ratio) scalability basis, the image is outputted in units of particular bit planes in each subband.

FIG. 1 is referred to again.

The quantizer 3 quantizes each inputted subband in quantization steps of Δ. The quantized index of each quantized value is applied to an entropy encoder 4. In the above process, quantization is performed in accordance with the following equations:

$$q = sign(c) floor(abs(c)/\Delta) \quad (3)$$

$$sign(c) = 1 \text{ for } c \geq 0 \quad (4)$$

$$sign(c) = -1 \text{ for } c < 0 \quad (5)$$

In the above equations, c denotes a coefficient to be quantized. Note that Δ can have a value equal to 1. However, when Δ is equal to 1, quantization is not performed and a subband inputted to the quantizer 3 is directly outputted to the entropy encoder 4.

The entropy encoder 4 expands the inputted quantized index into bit planes and performs two-level arithmetic coding on each bit plane. The result is outputted in the form of a code stream. The operation of the entropy encoder 4 is described below with reference to FIGS. 5A and 5B.

Figure 5B:
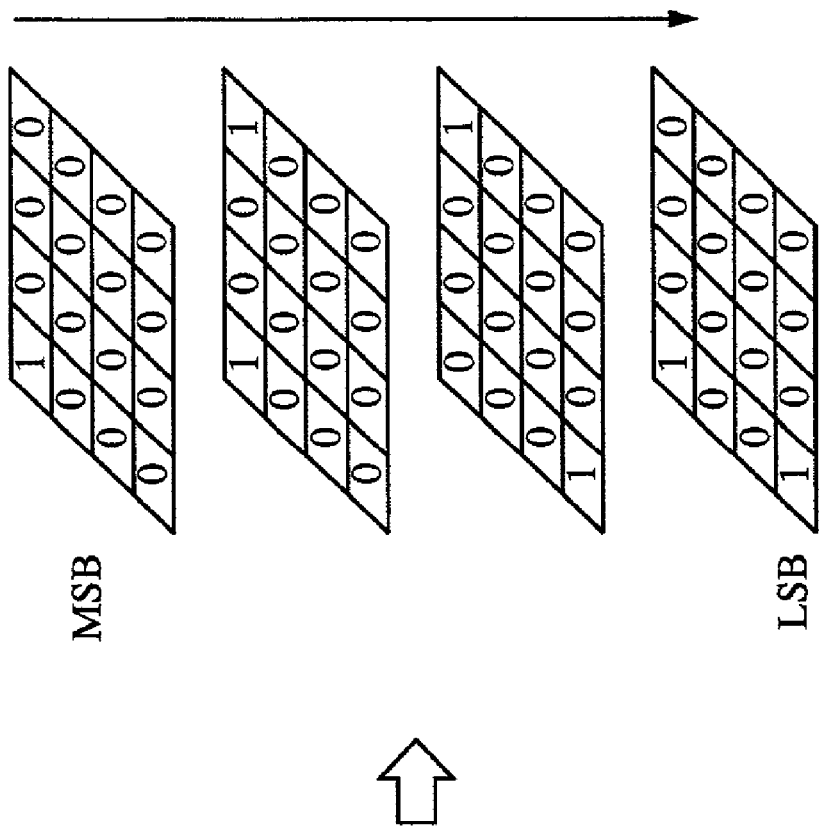
FIGS. 5A and 5B are schematic diagrams illustrating the operation of an entropy encoder.
Figure 5A:
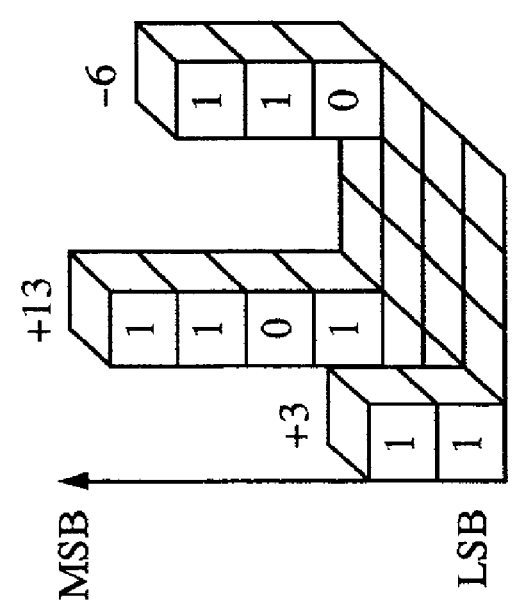

FIGS. 5A and 5B are schematic diagrams illustrating the operation of the entropy encoder 4.

In this specific example shown in FIG. 5, there are three non-zero quantized indices having values of +13, −6, and +3, respectively, in 4×4 subband areas. The entropy encoder 4 determines the maximum value M by scanning these subband areas and calculates the number of bits, S, required to represent the maximum quantized index, in accordance with the following equation:

$$S = ceil(log2(abs(M))) \quad (6)$$

In the above equation, ceil(x) represents a smallest integer of those equal to or grater than x.

Figure 16:
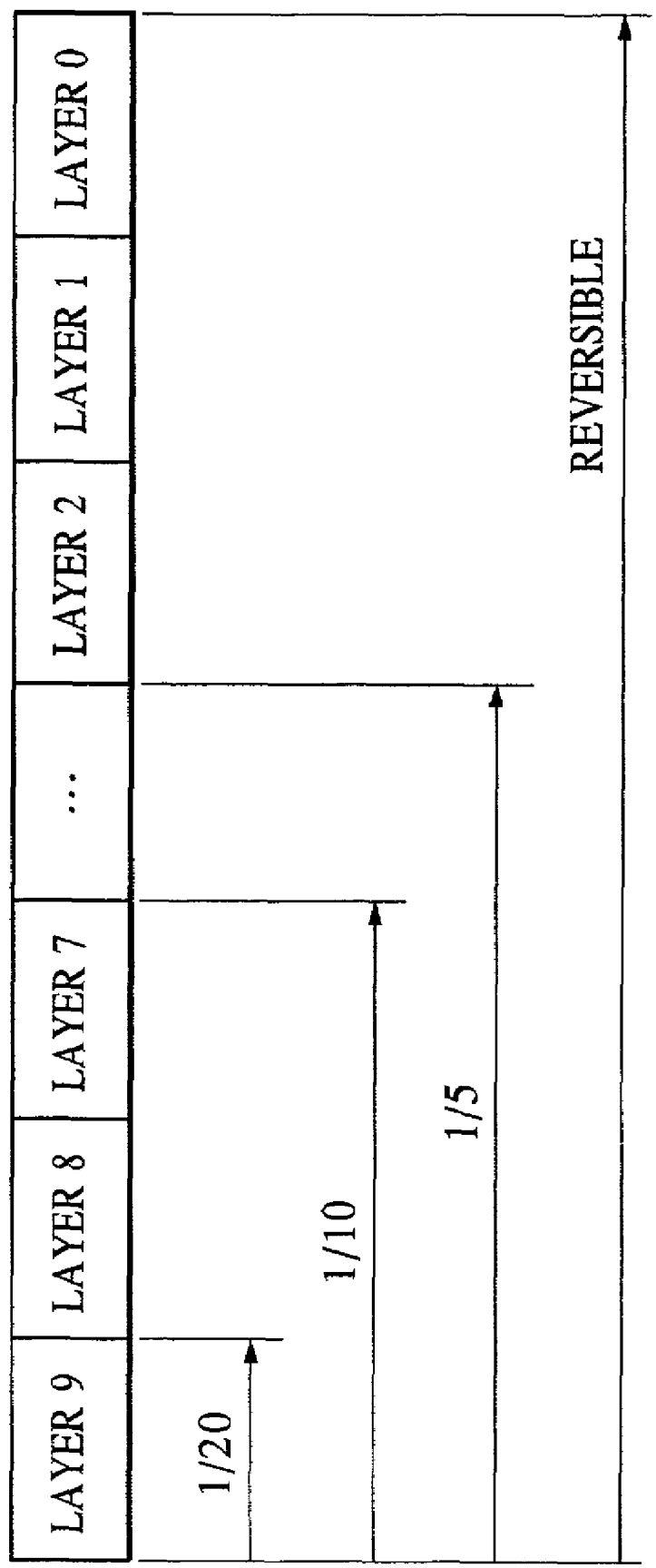
FIG. 16 is a schematic diagram illustrating the concept of layers according to the first embodiment of the present invention.

In the example shown in FIG. 5A, the maximum value is equal to 13, and thus S is determined to be 4 according to equation (6). Thus, as shown in FIG. 5B, 16 quantized indices in the sequence are processed in units of 4 bit planes. First, the entropy encoder 4 performs two-level arithmetic coding upon bits in the most significant bit plane (denoted by MSB in FIGS. 5A and 5B) and outputs the result in the form of a bit stream.

Thereafter, two-level arithmetic coding is performed on bits in a bit plane at an immediately lower level. Similarly, coding is performed from one bit-plane to another and the result is outputted to the code output unit 5 until bits in the least significant bit plane (denoted by LSB in FIGS. 5A and 5B) have been coded. In the above process, when a first non-zero bit is detected during the scanning of a bit plane, the corresponding code of the quantized index is immediately entropy-coded.

The coding is performed in the resolution-scalable fashion or the SNR-scalable fashion. The strategy of removing a particular part of a given bit stream depends upon whether the coding is performed in the resolution-scalable fashion or the SNR-scalable fashion, as is described below.

First, coding in the resolution-scalable basis is described.

FIGS. 6A to 6D are schematic diagrams illustrating sequences of codes obtained via resolution-scalable coding.

FIG. 6A illustrates the entire structure of a sequence of codes, wherein MH, TH, and BS denote a main header, a tile header, and a bit stream, respectively.

FIG. 6B illustrates the data structure of the main header MH. As shown in FIG. 6B, the main header MH includes data indicating the size (numbers of pixels as counted in horizontal and vertical directions) of an image to be coded, the size of each tile into which the image is divided, the number of color components, and component information indicating the magnitude of each component and bit accuracy. In the case where the image is not divided into tiles, the tile size becomes equal to the image size. When the image to be coded is a monochrome multi-level image, the number of components is equal to one.

FIG. 6C illustrates the data structure of the tile header TH. As shown in FIG. 6C, the tile header TH includes data indicating the tile length, which is the sum of the bit stream length of the tile and the header length of the tile, and coding parameters associated with the tile. The coding parameters include a discrete-wavelet transform level and the filter type.

FIG. 6D illustrates the data structure of the bit stream BS. As shown in FIG. 6D, the bit stream includes subbands, which are arranged in order of resolution starting from a subband having a lowest resolution to a subband having a highest resolution. Each subband includes bit planes of codes, which are arranged in order of bit plane starting from a most significant bit plane to a least significant bit plane. The resultant sequence of codes generated in the above-described manner is outputted to the code output unit 5.

By producing the sequence of codes in the above-described form, it becomes possible to perform decoding in a hierarchical fashion, as will be described later with reference to FIG. 12.

Now, coding on the SNR-scalable basis is described. FIGS. 7A to 7D are schematic diagrams illustrating sequences of codes obtained via SNR-scalable coding.

FIG. 7A illustrates the entire structure of a sequence of codes, wherein MH, TH, and BS denote a main header, a tile header, and a bit stream, respectively. FIG. 7B illustrates the data structure of the main header MH. As shown in FIG. 7B, the main header MH includes data indicating the size (numbers of pixels as counted in horizontal and vertical directions) of an image to be coded, the size of each tile into which the image is divided, the number of color components, and component information indicating the magnitude of each component and bit accuracy. In the case where the image is not divided into tiles, the tile size becomes equal to the image size. When the image to be coded is a monochrome multi-level image, the number of components is equal to one.

FIG. 7C illustrates the data structure of the tile header TH. As shown in FIG. 7C, the tile header TH includes data indicating the tile length, which is the sum of the bit stream length of the tile and the header length of the tile, and coding parameters associated with the tile. The coding parameters include a discrete-wavelet transform level and the filter type.

FIG. 7D illustrates the data structure of the bit stream BS. As shown in FIG. 7D, the bit stream includes bit planes arranged in order of bit plane starting from a most significant bit plane to a least significant bit plane. Each bit plane includes bits that are generated and arranged such that the quantized indices of the respective subbands are coded into sequences of bits, and bits of the respective subbands at particular locations in the sequences are taken and placed in the corresponding bit planes. In FIG. 7D, S denotes the number of bits necessary to represent a greatest quantized index. The resultant sequence of codes generated in the above-described manner is outputted to the code output unit 5.

By producing the sequence of codes in the above-described form, it becomes possible to perform decoding in a hierarchical fashion as will be described later with reference to FIG. 13.

In the process described above, the compression ratio of the entire coded image can be controlled by adjusting the quantization step $\Delta$.

Alternatively, in the coding performed by the entropy encoder 4, one or more low-order bit planes may be removed (discarded) depending on the desired value of the compression ratio. In this case, all bit planes are not coded, but a particular number of bit planes corresponding to the desired compression ratio are selected starting from a most significant bit plane and only the selected bit planes are coded. The sequence of codes finally obtained includes only the coded bit planes.

An image decoding apparatus for decoding the sequence of codes in the form of a bit stream outputted from the image coding apparatus is described below with reference to FIG. 8.

Figure 8:
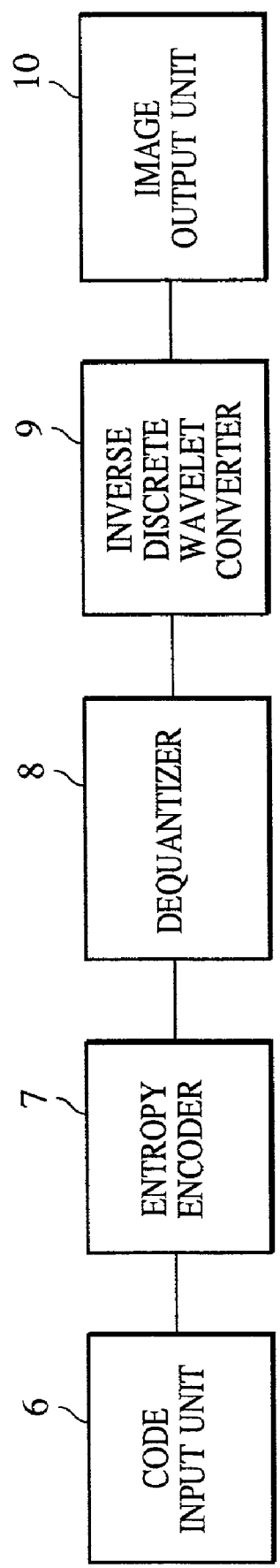
FIG. 8 is a block diagram of an image decoding apparatus.

FIG. 8 is a block diagram of the image decoding apparatus.

The image decoding apparatus includes a code input unit 6, an entropy decoder 7, a dequantizer 8, an inverse discrete wavelet transform unit (converter) 9, and an image output unit 10.

First, the sequence of codes is inputted to the code input unit 6. The code input unit 6 analyzes the header included in the inputted sequence of codes to extract a parameter necessary in the following process and transmits it to a unit responsible for the following process, wherein the code input unit 6 controls the flow of the process if necessary. The bit stream included in the sequence of codes is outputted to the entropy decoder 7.

The entropy decoder 7 decodes the bit stream from one bit plane to another and outputs the result. The operation of the entropy decoder 7 is described below with reference to FIGS. 9A and 9B.

Figure 9A:
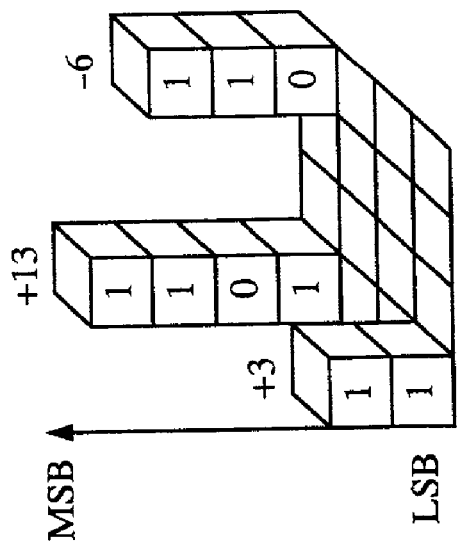
FIGS. 9A and 9B are schematic diagrams illustrating the operation of an entropy decoder.
Figure 9B:
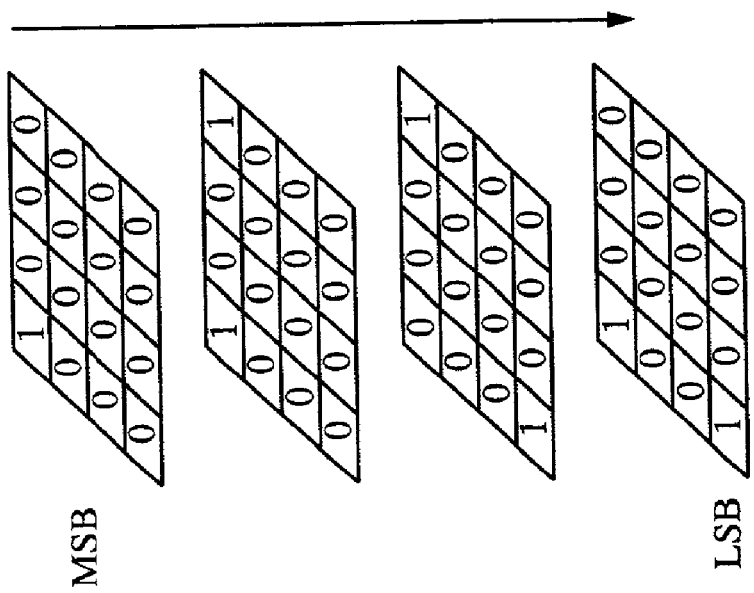

FIGS. 9A and 9B are schematic diagrams illustrating the operation of the entropy decoder 7.

FIG. 9A illustrates a flow of a process in which one subband area to be coded is sequentially decoded from one bit plane to another to finally decode the quantized index. In FIG. 9A, bit planes are decoded in the order denoted by an arrow. The result of the decoding is obtained as shown in FIG. 9B. The quantized indices obtained from decoding are applied to the dequantizer 8.

The dequantizer 8 dequantizes the quantized indices into discrete-wavelet transform coefficients in accordance with the following equations.

$$c' = \Delta \times q \text{ for } q \neq 0 \qquad (7)$$

$$c' = 0 \text{ for } q = 0 \qquad (8)$$

In the above equations, q denotes a quantized index, and $\Delta$ denotes a quantization step having the same value as that used in the encoding. c' denotes a decoded subband corresponding to a coded coefficient represented by s or d. The obtained subband c' is applied to the inverse discrete wavelet transform unit 9. The basis structure of the inverse discrete wavelet transform unit 9 is described below with reference to FIG. 10.

Figure 10:
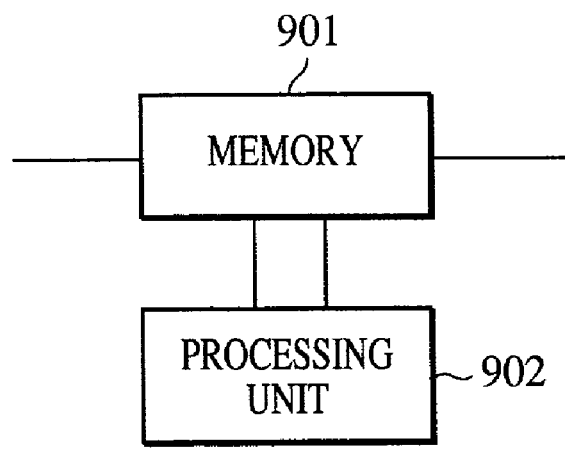
FIG. 10 is a block diagram illustrating a basic structure of an inverse discrete-wavelet transform unit.

FIG. 10 is a block diagram illustrating the basic structure of the inverse discrete wavelet transform unit 9.

FIG. 10, the inputted subbands are stored in a memory 901. A processing unit 902 performs a one-dimensional inverse discrete-wavelet transformation on the subbands stored in the memory 901. A two-dimensional inverse discrete-wavelet transformation is performed according to the above process by sequentially reading the transform coefficients from the memory 901. The two-dimensional inverse discrete-wavelet transformation is performed in the order opposite to that of the forward discrete-wavelet transformation. The two-dimensional inverse discrete-wavelet transformation is well known in the art, and thus it is not described herein in further detail.

The detailed structure of the processing unit 902 is described below with reference to FIG. 11.

Figure 11:
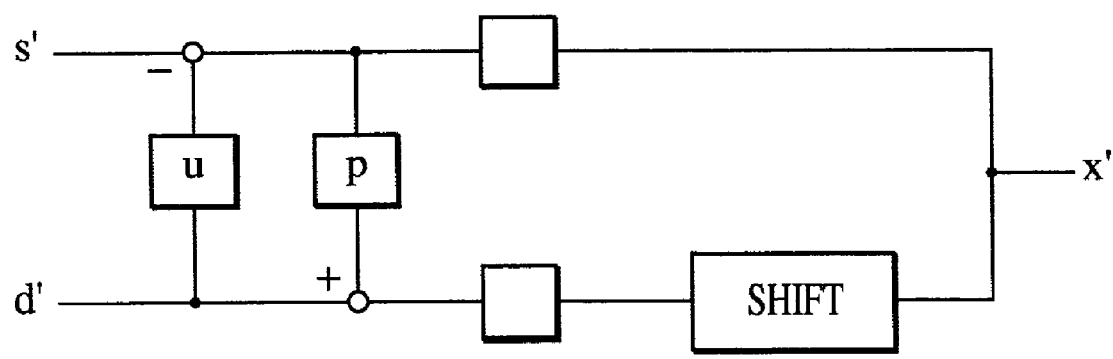
FIG. 11 is a diagram illustrating the details of a processing unit.

FIG. 11 is a diagram illustrating the details of the processing unit 902.

In FIG. 11, s' and d' denote a low-pass coefficient and a high-pass coefficient, respectively, obtained when one-level expansion is performed on one-dimensional image data, wherein s' and d' correspond to an even-numbered address and an odd-numbered address, respectively, Each subband data is passed through two filters u and p, respectively. The subband data outputted from the respective filters are combined together by an up sampler. As a result, image data x' is outputted. The above process is performed in accordance with the following equations:

$$x'(2n) = s'(n) - floor((d'(n-1) + d'(n))/4) \qquad (9)$$

$$x'(2n+1) = d'(n) + floor((x'(2n) + x'(2n+2))/2) \qquad (10)$$

The forward discrete-wavelet transformation represented by equations (1) and (2) and the inverse discrete-wavelet transformation represented by equations (9) and (10) are completely reversible. Therefore, in the present embodiment, if the quantization step Δ is equal to 1, and if all bit planes are decoded in the bit plane decoding process, then the decoded image data x' is absolutely identical to the original image data x.

The image data decoded in the above-described manner is applied to the image output unit 10. As for the image output unit 10, an image display device such as a monitor or a storage device such as a magnetic disk storage device may be employed.

Manners of displaying an image after performing decoding via the above-described process are described below.

First, the manner of displaying an image decoded in the resolution-scalable fashion is described.

FIGS. 12A and 12B are schematic diagrams illustrating sequences of codes and images, respectively, obtained via resolution-scalable decoding.

FIG. 12A illustrates an example of a sequence of codes having the same data structure as that shown in FIG. 6. However, when the entire image is set to be as a tile, the sequence of codes includes only one tile header and only one bit stream. As shown in FIG. 12A, the bit stream BS0 includes subbands arranged in order of resolution starting from a lowest-resolution subband LL toward a highest-resolution subband.

The image decoding apparatus sequentially reads the subbands in the bit stream and decodes them. When decoding of each subband is completed, the resultant image is displayed. FIG. 12B illustrates images corresponding to the respective subbands. As shown, the size of the respective images varies in correspondence with the subbands. In this specific example, the two-dimensional discrete-wavelet transformation is performed on the two-level basis. Therefore, when the image is displayed after decoding only the LL subband, the resultant image has a size that is ¼ that of the original image in both horizontal and vertical directions. When the image is displayed after further decoding all level-2 subbands, the resultant image has a size that is ½ that of the original image in both horizontal and vertical directions. If the image is displayed after further decoding all level-1 subbands, the resultant image has a size that is the same as that of the original image.

Now, the manner of displaying an image decoded in the SNR-scalable fashion is described.

Figure 13A:
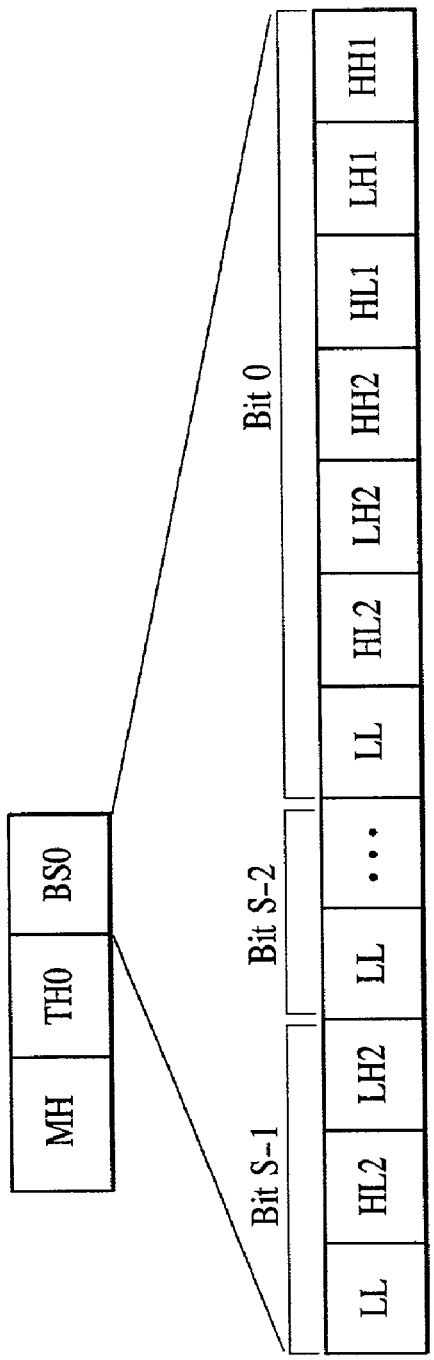
FIGS. 13A and 13B are schematic diagrams illustrating sequences of codes and images, respectively, obtained via SNR-scalable decoding.
Figure 13B:
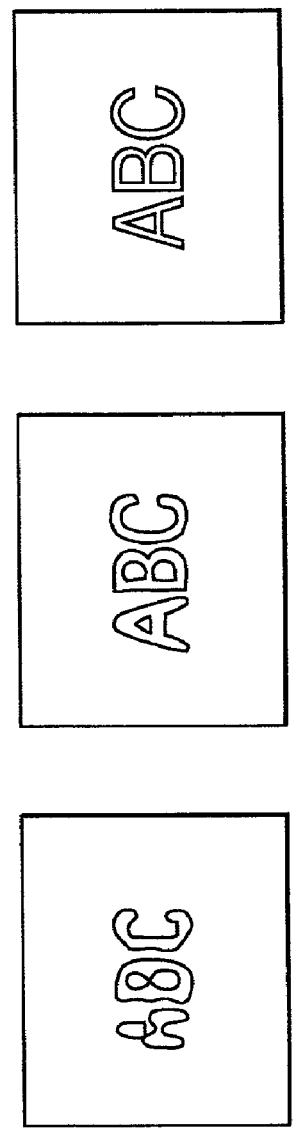

FIGS. 13A and 13B area schematic diagrams illustrating sequences of codes and images, respectively, obtained via SNR scalable decoding.

FIG. 13A illustrates an example of a sequence of codes having the same data structure as that shown in FIG. 7. However, when the entire image is set to be as a tile, the sequence of codes includes only one tile header and only one bit stream. As shown in FIG. 13A, the bit stream BS0 includes bit planes arranged starting from a highest-order bit plane toward a lowest-order bit plane.

The image decoding apparatus sequentially reads the bit stream and decodes it. When decoding of each bit plane is completed, the resultant image is displayed. FIG. 13B illustrates how the image quality changes during the decoding process in which decoding is performed sequentially for the respective bit planes starting from the highest-order bit plane toward to the lowest-order bit plane. When the image is displayed after decoding only high-order bit planes, only a general feature of the image is displayed. As the decoding proceeds toward the lowest-order bit plane, the image quality is gradually improved. In the case where the quantization step Δ equal to 1 is employed in the quantization process, the decoded image becomes absolutely identical o the original image when decoding is completed for all bit planes.

In the above process, by removing (neglecting) lower-order bit planes in the decoding performed by the entropy decoder 7, it is possible to reduce the amount of data to be decoded. This makes it possible to control the compression ratio. That is, it is possible to obtain a decoded image having a desired image quality from a particular amount of data. If the quantization is performed using a quantization step Δ equal to one, and if all bit planes are decoded in the decoding process, the image is coded and decoded in a reversible fashion, that is, the image obtained as a result of decoding the coded image is absolutely identical to the original image.

In the present invention, the processing algorithms employed in the image coding apparatus and the image decoding apparatus, respectively, do not necessarily need to be absolutely identical to those described above. For example, a sequence of codes in two different scalable fashions may also be generated using the coding technique in accordance with the JPEG2000 standard. In this case, the bit planes described above correspond to layers according to the JPEG2000 standard, wherein each layer includes coded data associated with a predetermined number of coding paths.

FIRST EMBODIMENT

An image processing system according to a first embodiment of the present invention, in which the above-described coding algorithm based on, for example, JPEG2000 may be preferably employed, is described below with reference to FIG. 14.

Figure 14:
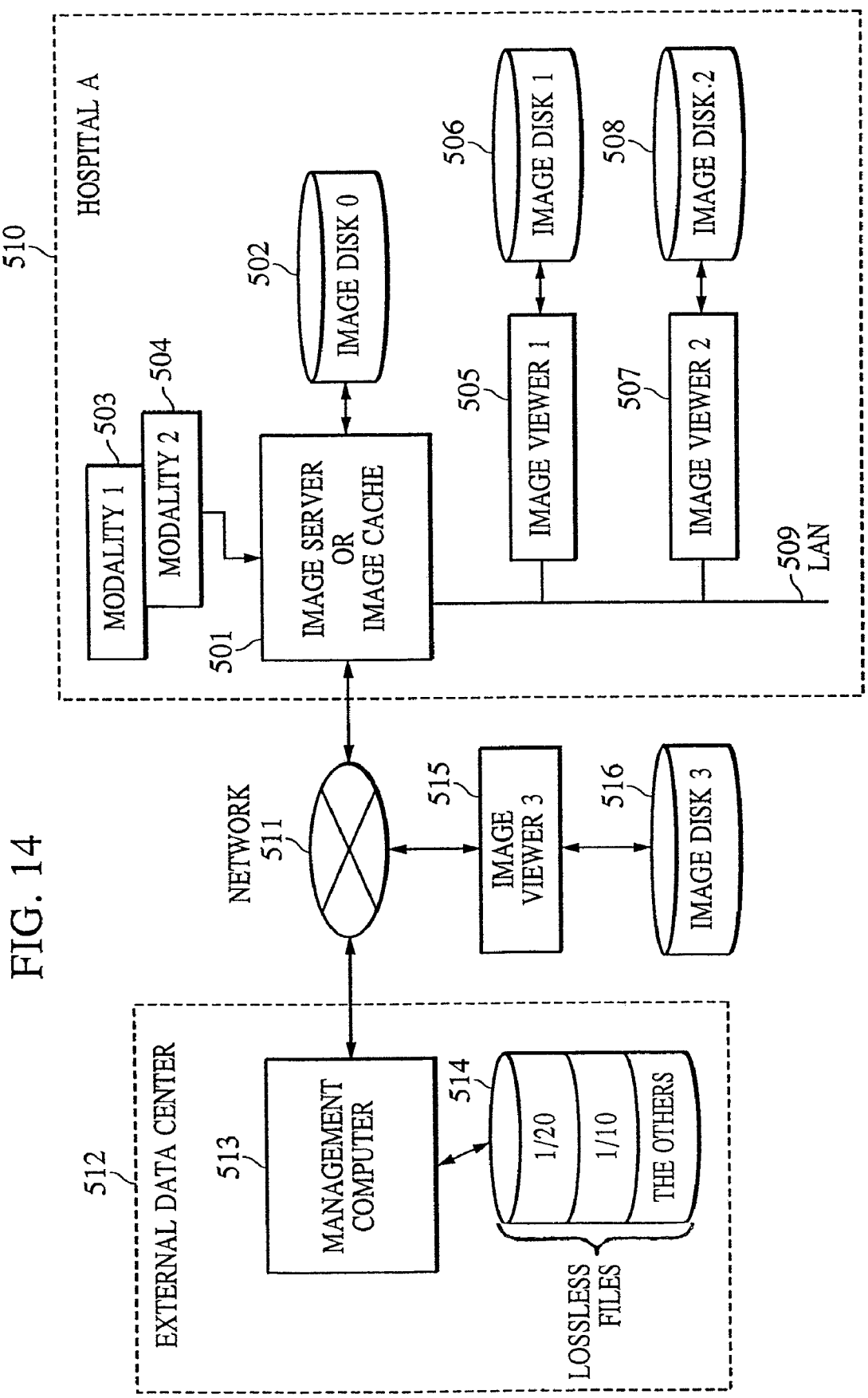
FIG. 14 is a block diagram illustrating an image processing system according to a first embodiment of the present invention.

FIG. 14 is a block diagram illustrating the image processing system according to the first embodiment of the present invention.

The image processing system according to the first embodiment of the present invention includes an external data center 512, which manages images such as medical images, a hospital A (510), and a terminal such as a personal computer having an image viewer-3 (515), all connected to each other via a network 511 such as the Internet.

In the hospital A (510), an image server (or image cache) 501 temporarily stores, on an image disk-0 (502), an image such as a medical image generated by a modality unit-1 (503) or a modality unit-2 (504) connected to the image server 5 via a network. Specific examples of the modality unit-1 (503) or the modality unit-2 (504) include an X-ray image apparatus, a CT apparatus, an MRI apparatus, and an ultrasonic image apparatus.

The image outputted from the modality unit-1 (503) or the modality unit-2 (504) to the image server 501 may have already been compression-coded by means of the DWT, described above, or may not have been compression-coded. In particular, when the image is transferred to the image server 501 without being compression-coded, the image server 501 performs compression coding on the received image, using a compression coding capability provided in the image server 501.

The image disk-0 (502) connected to the image server 501 does not necessarily need to have a very high storage capacity, because the image disk-0 (501) is used to temporarily store the image received from the modality unit-1 (503) or the modality unit-2 (504) for a few days.

The images stored on the image disk-0 (502) are transferred to the external data center 512 via the network 511 in the order of date/time when the image was taken. In the external data center 512, the received image is stored in a storage unit 514 connected to a management computer 513. Herein, by way of example, images are stored in the form of lossless coded files.

In the case where images are stored in the form of lossless coded files, an image data stream stored in any image file can be decoded into an image that is absolutely identical in bit level to a corresponding original image. The image data streams of image files stored in the storage unit 514 are organized in accordance with, for example, the compression ratio. In the example shown in FIG. 14, each image data stream includes parts corresponding to compression ratios of 1/20 and 1/10, respectively, and the remaining part, wherein those parts are stored separately in different storage areas.

Figure 17:
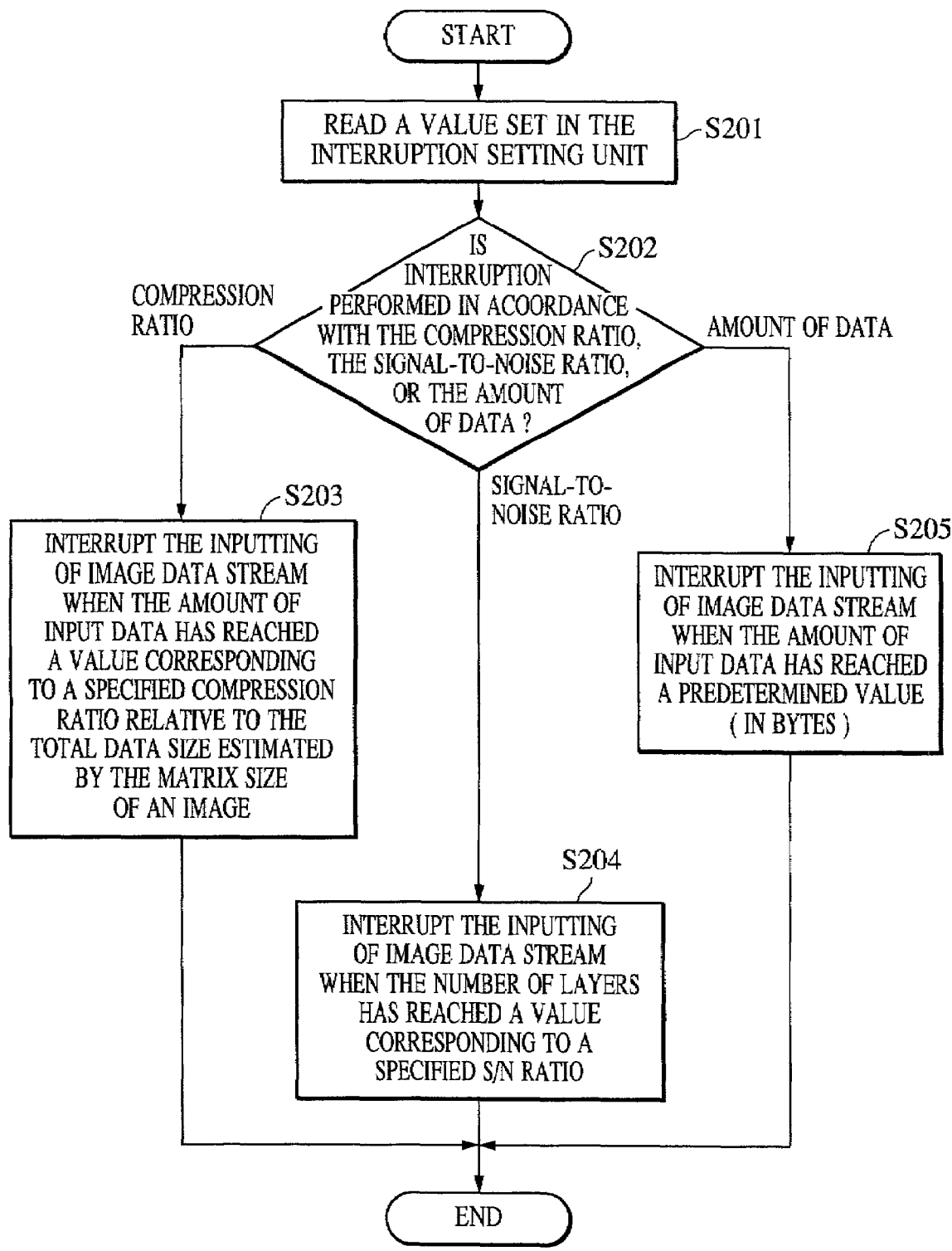
FIG. 17 is a flow chart illustrating the operation of interrupting an image data stream, according to the first embodiment of the present invention.

In FIG. 17, when a starting part of an image data stream at the beginning of a lossless coded file stored in the storage unit 514 is decoded, the resultant decoded image has a compression ratio of 1/20. If the following part of the stream is further decoded, the resultant decoded image has a compression ratio of 1/10. When all of the remaining part is further decoded, an image is obtained that has been decoded in a lossless fashion (without having degradation) and that is thus absolutely identical to its original image. The coding to generate those image files and the decoding of the image files may be performed in a similar manner as described above with reference to the image coding apparatus and the image decoding apparatus.

An image viewer-1 (505) or an image viewer-2 (507) of a terminal such as a personal computer gets access to the storage unit 514 of the management computer 513 via the image server 501 and displays an obtained image. In this process, an interrupted stream of the image data stream to be displayed is cached on the image disk-1 (506) and the image disk-2 (508) depending upon the content of the image data stream. Herein, the term "interrupted stream" is used to describe a partial image data stream obtained when its original image data stream is interrupted. As for the image disk-1 (506) and the image disk-2 (508), a DRAM (Dynamic Random Access Memory) or storage device such as a hard disk installed on the computer may be employed.

The image viewer-1 (505) and the image viewer-2 (507) are connected to the image server 501 via a LAN 509. The image viewer-1 (505) and the image viewer-2 (507) serve as client terminals of the image server 501. The image viewer-1 (505), the image viewer-2 (507), and the image server 501 form a server/client system.

A specific example of a process executed in the image processing system according to the first embodiment of the present invention, and the operation of performing the process are described below.

In the process described below, it is assumed, by way of example, that an image of a patient P1 is taken, Oct. 31, 2000, by the modality unit-1 (503) and stored as a file with a name of P1-20001031 in the storage unit 514 of the external data center 512. When a doctor D1 wants to view this image, the image can be displayed on the image viewer-1 (505) as described below.

First, the doctor D1, who is an operator of the image viewer-1 (505), issues a request for an image (having a file name of, for example, P1-20001031) to the image server 501. The image server 501 transfers the received request to the management computer 513 of the external data center 512. The management computer 513 reads the requested image (image data stream) from the storage unit 514 and transfers the image data stream to the imager server 501 via the network 511.

The structure and the functions of the image view-1 (505) are described below with reference to FIG. 15.

Note that the image viewer-2 (507) and the image viewer-3 (515) may have a similar structure and functions to those of the image viewer-1 (505).

Figure 15:
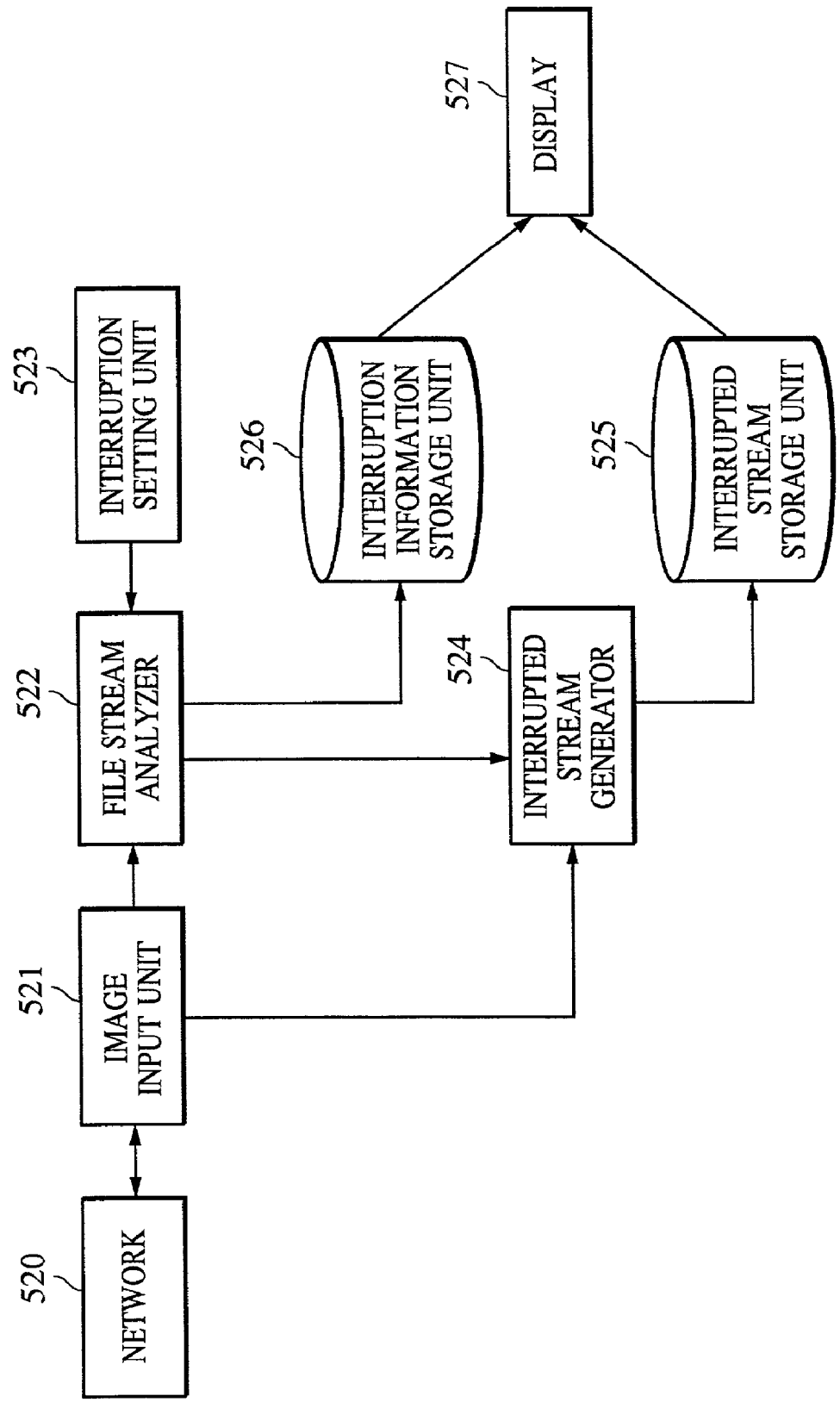
FIG. 15 is a functional block diagram of an image viewer according to the first embodiment of the present invention.

FIG. 15 is a functional block diagram of the image viewer according to the first embodiment of the present invention.

A network unit 520 for transmitting and receiving data is connected to the network. An image input unit 521 serves to input an image data stream received via the network unit 520. The input image data stream is supplied to an interrupted-stream generator 524.

A file stream analyzer 522 analyzes the content of the image data stream inputted via the image input unit 521, with respect to the reference value set in the interrupt setting unit 523. In accordance with an analysis result, the file stream analyzer 522 controls the operation performed by the interrupted-stream generator 524 to interrupt the image data stream inputted via the image input unit 521. The file stream analyzer 522 generates interrupt information concerning the interruption of the image data stream and stores it into the storage unit 526.

Although in the example shown in FIG. 15, the storage unit 525 and the storage unit 526 are constructed in a separate fashion, they may be formed in different storage areas in a single storage unit.

An interrupt setting unit 523 sets the reference value used by the file stream analyzer 522 and manages it. The setting of the reference value may be performed using an input device such as a keyboard or a mouse. The interrupted-stream generator 524 temporarily stores the image data stream inputted via the image input unit 521 and interrupts the image data stream in accordance with a command issued by the file stream analyzer 522, thereby generating an interrupted stream, which is a part of the complete image data stream, from the image data stream that has already been input. The resultant interrupted stream is stored in the storage unit 525.

A display unit 527 generates and displays an image according to the interrupted stream stored in the storage unit 525 and also according to the interrupt information stored in the storage unit 526.

The operation of the image viewer-1 (505) is described below with reference to a specific example of the operation of executing the above process.

The image data stream read from the management computer 513 is inputted to the image input unit 521 via the network unit 520. The inputted image data is called the image data stream because it is transferred starting from the beginning of the data to the end thereof.

While the image data stream is inputted to the image input unit 521, the content of the already-input part thereof is analyzed in real time by the file stream analyzer 522, starting from the beginning part thereof. The purposes of the analysis are to detect the content of the image data stream and to interrupt the image data stream in accordance with the detected content. The reference value is set in the interrupt setting unit 523 so as to achieve the above purpose.

In this first embodiment, the reference value may concern the compression ratio or signal-to-noise ratio of the image data. Alternatively, the reference value concerning the amount of data of the image data may be employed. Note that in the present invention, the reference value is not limited to those.

Now, the operation is described below for the case where the compression ratio is set as the reference value in the interrupt setting unit 523 and the file stream analyzer 522 analyzes the compression ratio of the image data stream, whereby the image data stream is interrupted in accordance with an analysis result.

The image input unit 521 reads the header of the image data stream having a file name "P1-20001031" to detect the matrix size. Herein, the total data size of the entire image data stream estimated from the matrix size is assumed to be 10 Mbytes.

If it is assumed that the compression ratio is set as 1/20 in the interrupt setting unit 523, the file stream analyzer 522 monitors the data amount of the image data stream inputted to the image input unit 512, and, when the data amount of the image data stream inputted to the input unit 521 has reached 500 Kbytes, the file stream analyzer 522 outputs an end signal to the interrupted-stream generator 524 and also to the image input unit 521, thereby commanding them to interrupt the inputting of the image data stream.

Note that because the image data stream is coded in units of bit planes as described earlier, the inputting of the image data stream is not interrupted in the middle of a bit plane but at the end of it. In the case where the compression ratio has reached the reference value in the middle of a certain bit plane, that bit play may be incorporated into the interrupted stream as required.

From the interrupted image data stream, the interrupted-stream generator 524 generates an interrupted stream, and an image reproduced from the interrupted stream is displayed on the display unit 527. When the image is displayed, the interrupt information is also displayed to indicate that the image being displayed has a compression ratio of 1/20. The interrupt information may be superimposed on the image or may be displayed in an area outside the image area.

In this first embodiment, the image decoding apparatus is assumed to be installed in the display unit 527.

Now, the operation is described for the case where a reference value of the signal-to-noise ratio is set in the interrupt setting unit 523 and the file stream analyzer 522 analyzes the signal-to-noise ratio of the image data stream, whereby the image data stream is interrupted in accordance with the analysis result.

The coding process based on the signal-to-noise ratio has not yet been described in detail, and thus it is now described.

In the coding by means of the DWT according to the JPEG2000 standard, subbands and bit planes are organized into layers. The layers may be constructed on the basis of the signal-to-noise ratio, although the layers may also be constructed on the basis of another type of reference value.

The concept of layers is described below with reference to FIG. 16. FIG. 16 is a schematic diagram illustrating the concept of layers according to the first embodiment of the present invention.

As shown in FIG. 16, a sequence of codes is composed of 10 layers (layer-9 to layer-0). In the case where all layers from the highest-level layer (layer-9) to the lowest-level layer (layer-0) are decoded, the sequence of codes is decoded in a completely reversible fashion. Herein, the amount of data of the highest-level layer (layer-9) corresponds to a compression ratio of 1/20 relative to the total data amount of the complete image data stream. The sum of data amounts of the layers from the layer-9 to the layer-7 corresponds to a compression ratio of 1/10. Although, in the present example, the layers are constructed such that each layer includes a particular amount of data corresponding to a particular compression ratio, the layers may also be constructed on the basis of the signal-to-noise ratio.

The manner of constructing layers on the basis of the signal-to-noise ratio is described below.

First, for example, a layer is constructed such that data coded into that layer corresponds to a signal-to-noise ratio of 50 db. A layer corresponding to a signal-to-noise ratio of 55 db is then constructed. Thereafter, a layer corresponding to a signal-to-noise ratio of 60 db is constructed. Note that there is no particular limitation on the number of layers. For example, an image data stream may be coded into layers corresponding to 50 db, 55 db, 60 db, and lossless quality, respectively.

The advantage obtained by interrupting an image data steam inputted to the image input unit 521 in accordance with the signal-to-noise ratio is that although the signal-to-noise ratio of an image generated by the modality unit-1 (503) or the modality unit-2 (504) greatly varies depending upon the type of the image even for the same compression ratio, the interruption based on the signal-to-noise ratio makes it possible to reproduce an image with a specified image quality regardless of the type of the image.

For example, the spectrum analysis on a CT image indicates that the CT image has very high frequency components, which can cause noise to become conspicuous at an edge when the compression ratio is set to be very high. On the other hand, in an X-ray image, a blur at an edge does not result in a significant problem because the structure itself being viewed by a doctor has a blur. As can be understood from the above discussion, interrupting an image data stream inputted to the image input unit 521 on the basis of the signal-to-noise ratio is useful to reproduce an image having a specified image quality (signal-to-noise ratio) regardless of the type of the image.

In the case where the reference value of the signal-to-noise ratio is set to 50 db in the interrupt setting unit 523, the file stream analyzer 522 monitors the image data stream inputted to the image input unit 521 and issues an end signal to the interrupted-stream generator 524 and the image input unit 521 when a layer (the first layer in the specific example described above) corresponding to the signal-to-noise ratio of 50 db is inputted, thereby commanding them to interrupt the inputting of the image data stream.

Note that the values of the signal-to-noise ratios corresponding to the respective layers included in a coded image data stream should be defined as reference values in the interrupt setting unit 523. Empirically, it is adequate to set the reference values to 50, 55, 60, and lossless quality. In this case, however, it is impossible to interrupt an image data stream such that a resultant interrupted stream has a signal-to-noise ratio equal to a value, such as 57 db, which is not defined as the reference value.

When it is desired to interrupt an image data stream at a value different from any of the defined reference values, it is required that the management computer 513 code the image data streams into layers such that the layers include one that corresponds to the desired value of the signal-to-noise ratio. That is, a coded image data stream including layers corresponding to 50, 55, 60, and lossless quality can be re-encoded so as to include layers corresponding to, for example, 52, 57, 62, and lossless quality, thereby making it possible to interrupt the image data stream being inputted to the image input unit 521 such that the resultant interrupted stream has a desired value of the signal-to-noise ratio.

Now, the operation is described below for the case where a particular value of the amount of data is set as the reference value in the interrupt setting unit 523 and the file stream analyzer 522 analyzes the data amount of the image data stream, whereby the image data stream is interrupted in accordance with the analysis result.

In this case, the inputting of the image data stream is interrupted when the data amount of the inputted image data stream has reached the reference value regardless of the matrix size of original image data described in a lossless file. For example, whether the data size of the original image data is equal to 10 Mbytes or 1 Kbytes, the inputting of the image data stream is interrupted when the amount of inputted data becomes equal to the defined reference value.

More specifically, in the case where the reference value of data amount is set to 500 Kbytes in the interrupt setting unit 523, the file stream analyzer 522 monitors the image data stream being inputted to the image input unit 521 and issues an end signal to the interrupted-stream generator 524 and the image input unit 521 when the data amount of the image data stream that has already been inputted to the image input unit 512 reaches 500 Kbytes, thereby commanding them to interrupt the inputting of the image data stream.

Also in this case as in the case where the image data stream is interrupted on the basis of the compression ratio, the image data stream is not interrupted in the middle of a bit plane even if the data amount has reached the reference value, but the inputting of the image data stream is interrupted at the end of that bit plane.

The operation of interrupting the image data stream has been described above for three different types of reference values. The operation flow is further described below with reference to FIG. 17.

FIG. 17 is a flow chart illustrating the operation of interrupting an image data stream, according to the first embodiment of the present invention.

First, in step S201, the file stream analyzer 522 reads the reference value defined in the interrupt setting unit 523.

In step S202, the file stream analyzer 522 analyzes an image data stream being inputted to the image input unit 521 with respect to a particular type of reference value defined in the interrupt setting unit 523. If the reference value is of the compression ratio, the process proceeds to step S203. In the case where the reference value is of the signal-to-noise ratio, the process goes to step S204. However, if the reference value is of the amount of data, the process proceeds to step S205.

In step S203, the data amount corresponding to the compression ratio set as the reference value is calculated from the data size determined from the matrix size of the image data stream inputted to the image input unit 521. When the data amount of the image data stream that has already been inputted to the image input unit 521 has reached the calculated value corresponding to the reference value of the compression ratio, the file stream analyzer 522 issues an end signal to the interrupted-stream generator 524 and the image input unit 521, thereby commanding them to interrupt the inputting of the image data stream.

In step S204, when a particular number of layers, corresponding to the signal-to-nose ratio set as the reference value, of the image data stream have been inputted to the image input unit 521, the file stream analyzer 522 issues an end signal to the stream-stream generator 524 and the image input unit 521, thereby commanding them to interrupt the inputting of the image data stream.

In step S205, when the data amount of the image data stream that has already been inputted to the image input unit 521 has reached the reference value, the file stream analyzer 522 issues an end signal to the stream-stream generator 524 and the image input unit 521, thereby commanding them to interrupt the inputting of the image data stream.

The operation is further described below, referring again to FIG. 15.

The interrupted stream generated by the interrupted-stream generator 524 is stored in the storage unit 525 and is used as cached data. The file stream analyzer 522 also generates interrupt information when the interruption is performed and stores it in the storage unit 526. This interrupt information associated with the interrupted stream is used when the image is displayed or when the remaining part of the image data stream is inputted later.

The interrupt information includes data indicating the compression ratio, the signal-to-noise ratio, and the data size of the interrupted image data stream. The interrupt information may also include data indicating the matrix size of the image data stream, the data depth, and/or the data size of the lossless file.

After displaying an image reproduced from the interrupted stream, the reproduced image data can be reused as described below.

For example, let us assume that an image with a file name of P1-20001031 has been displayed in response to a request issued by a doctor D1 and, as a result, an interrupted stream of the image of P1-20001031 is retained in the storage unit 525 of the image disk-1 (506).

In this situation, if another doctor D2 operates the image viewer-1 (505) to issue a request for displaying the image having the file name of P1-20001031, which was displayed by the doctor D1 in the past, it is determined whether the requested image is retained in the storage unit 525 of the image disk-1 (506). In this specific example, it is determined that the requested image is retained, and thus the image viewer-1 (506) displays the requested image using the image data retained in the storage unit 525.

In this case, a request for the image is not transmitted from the image viewer-1 (506) to the external data center 512. However, if the doctor D2 is not satisfied with the image of the file name of P1-20001931 displayed with the compression ratio of 1/20 set in the interrupt setting unit 523, and if the doctor D2 issues a request for the image with higher quality, or if a high-quality display button disposed on the image screen provided by the image viewer-1 (506) is clicked, a request for the higher-quality image is transmitted to the external data center 512.

More specifically, for example, if the doctor D2 is not satisfied with the image with the compression ratio of 1/20 displayed on the image viewer-1 (506), and if the doctor D2 issues a request for an image with a compression ratio of 1/10 to improve the image quality of the currently displayed image, the image viewer-1 (505) uploads the interrupt information associated with the image having the file name of P1-20001031 to the file stream analyzer 522 and also uploads the interrupted stream to the interrupted-stream generator 524 from the storage unit 525.

To obtain a partial image data stream corresponding to the compression ratio of 1/10, the image viewer-1 (505) issues a request for the partial image data stream to the management computer 513. In response to the request, the management computer 513 reads a partial image data stream following the partial image data stream corresponding to the compression ratio of 1/20 from the complete image data stream having the file name of P1-20001031 stored in the storage unit 514, and the management computer 513 transfers it to image viewer-1 (505). However, the partial image data stream corresponding to the compression ratio of 1/20 is not transferred. That is, the transfer is performed only for the part of the image data stream that is necessary.

The partial image data stream transmitted from the management computer 513 is inputted to the image input unit 521 via the network unit 520. The image input unit 521 transfers the received image data stream to the interrupted-stream generator 524. The interrupted-stream generator 524 combines the newly acquired partial image data stream corresponding to the compression ratio of 1/10 and the already existing partial image data stream corresponding to the compression ratio of 1/20 into a single image data stream.

The resultant image data stream is stored in the storage unit 525. The file stream analyzer 522 generates interrupt information associated with the image with the compression ratio of 1/10 and stores the resultant interrupt information into the storage unit 526. If the doctor D2 further issues a request for a lossless-quality image, a request for a partial image data stream necessary to generate the lossless image is transmitted to the management computer 513 in a similar manner.

An example of an image screen displayed by the image viewer-1 (505) in the above process is described below with reference to FIG. 18.

Figure 18:
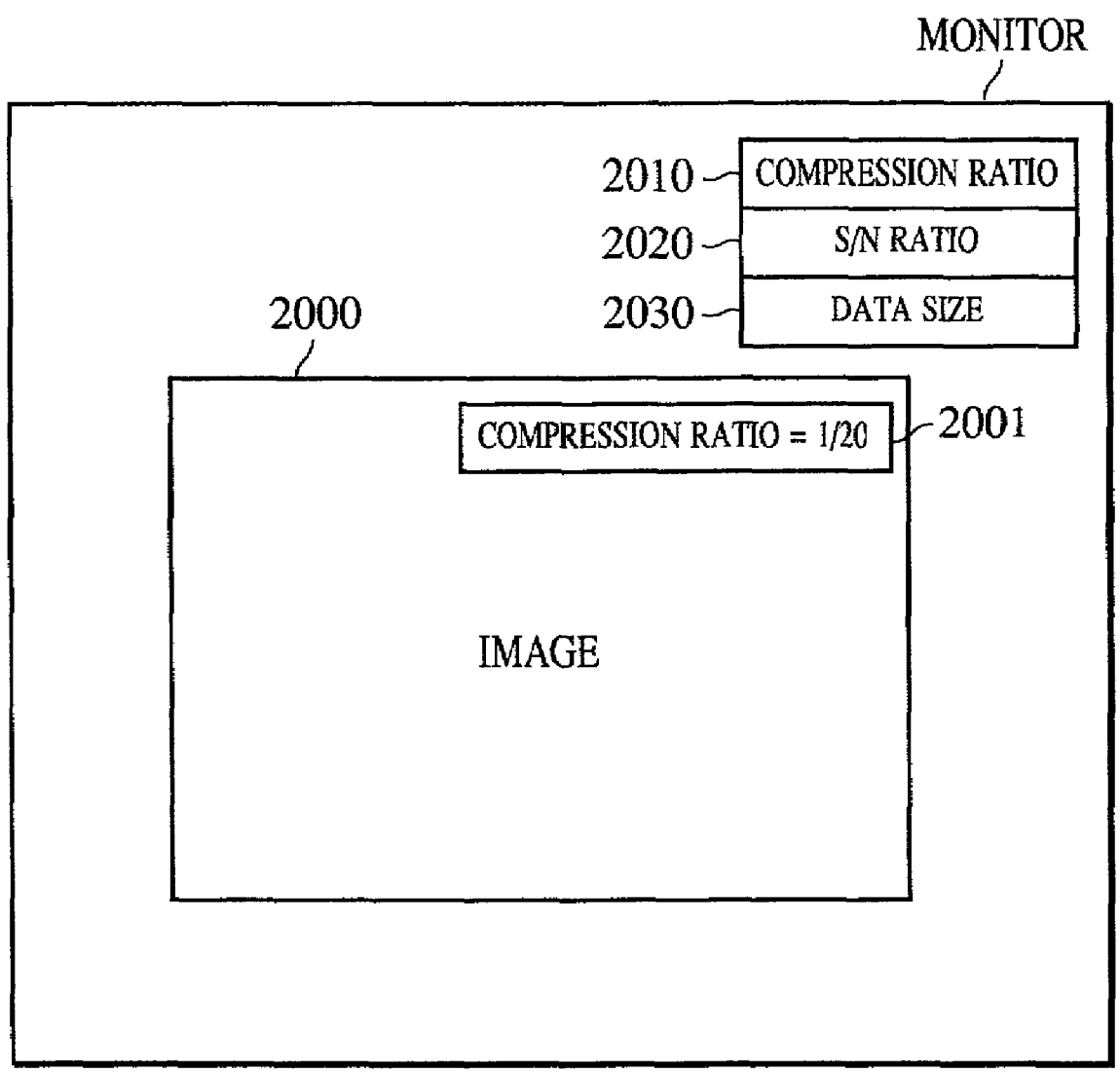
FIG. 18 is a schematic diagram illustrating an example of an image screen of an image viewer according to the first embodiment of the present invention.

FIG. 18 is a schematic diagram illustrating an example of an image screen displayed by the image viewer-1 according to the first embodiment of the present invention.

As shown in FIG. 18, interrupt information 2001 (compression ratio of 1/20) is displayed as an overlying image in an image 2000 which is displayed on the monitor in response to a request.

The image quality of the image 2000 can be changed by selecting one of the selection buttons (compression ratio button 2010, a signal-to-noise ratio button 2020, and data amount button 2030) and further selecting one of values listed in a menu that appears when a selection buttons is clicked, thereby issuing a request for displaying an image with higher quality.

In the example shown in FIG. 18, only one type of data of the interrupt information 2001 is displayed. Alternatively, two or more types of data of the interrupt information may be displayed in the overlying area in the image 2000, depending upon the contents of the defined reference values.

When an image is displayed on the image viewer-1 (505) in accordance with image data received from the image server (image cache) 501, it is possible quickly also to display the same image on the image viewer-2 (507) as described below.

Although this technique is similar to the function of a cache server provided in a proxy server, which is widely used in the art, the difference is that caching is performed for an interrupted image data stream.

In the conventional technique, a partial data file or a partial image file is useless unless a complete data file or a complete image file is obtained. For example, when WEB image data is being received, if the reception is interrupted before receiving the entire WEB image data, the received part of the WEB image data is discarded without being stored in the cache server. However, a conventional WEB viewer has a capability of storing a partial image data file. For example, a partial image data file with a certain resolution or image quality obtained by interrupting the data can be retained in an offline mode.

However, unlike the technique according to the present invention, the conventional WEB viewer does not have the capability of caching a partial data file obtained by interrupting input of data at a particular meaningful point of the data according to an analysis result on the content (bit planes, subbands, or layers) of the data being inputted. Note that unlike the conventional technique, the present invention allows an image to be displayed at an enhanced high speed and also allows a reduction in the traffic via a network.

The functional configuration of the image server (or image cache) 501 according to the present invention is described below with reference to FIG. 19.

Figure 19:
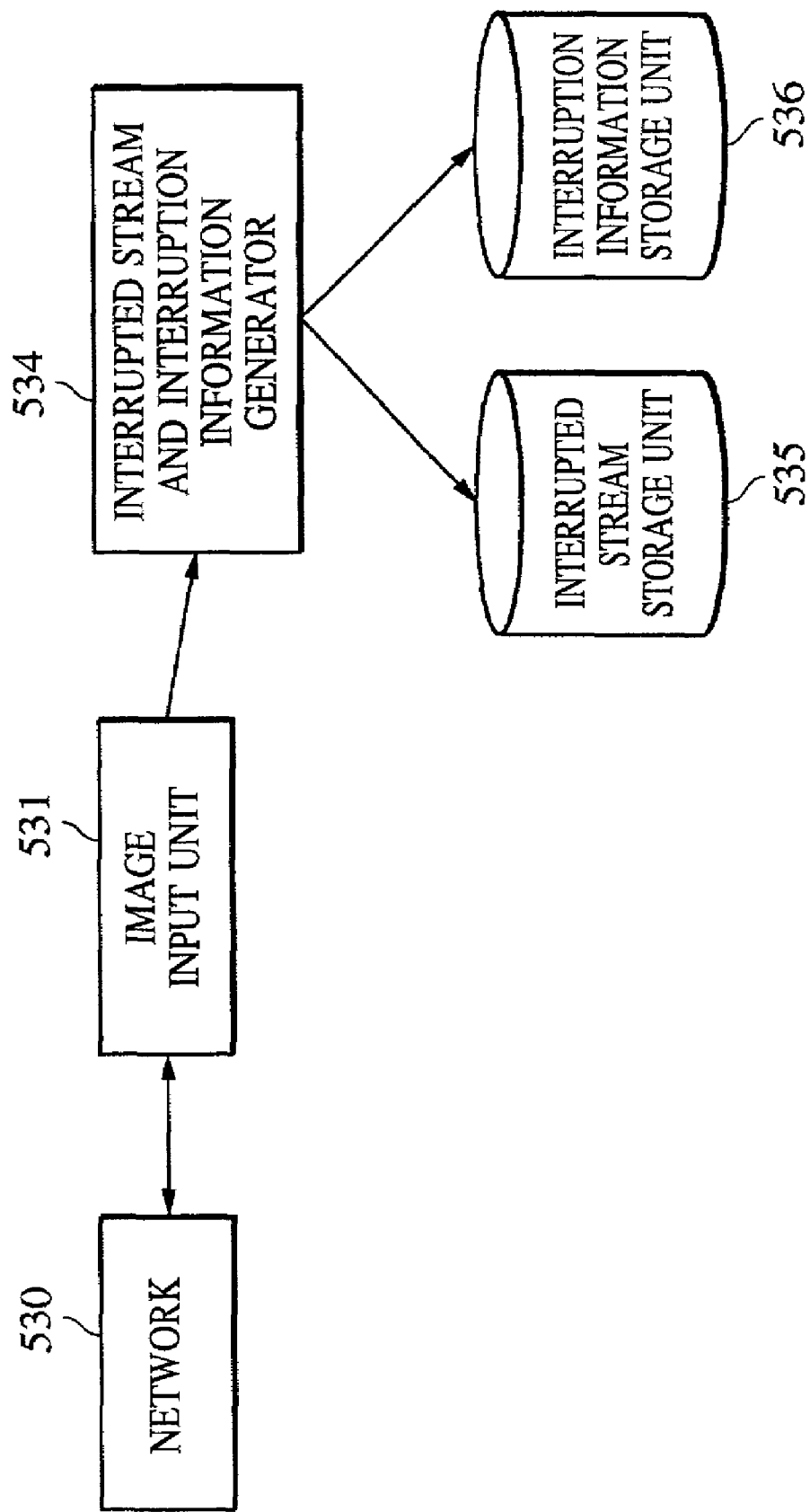
FIG. 19 is a functional block diagram of an image server according to the first embodiment of the present invention.

FIG. 19 is a functional block diagram of the image server according to the first embodiment of the present invention. Note that only those parts which are essential to the present invention are shown in FIG. 19.

If a request for an image (such as an image with a file name of P1-20001031) is issued by the image viewer-1 (505) to the external data center 512, an image data stream of the requested image is transmitted to the image viewer-1 (505) via the image server 501. When the image data stream is transmitted to the image viewer-1 (505), a copy of the image data stream is also inputted to the image input unit 531 via the network unit 530.

From the inputted image data stream, an interrupted stream and interrupt information are generated by the interrupted-stream and interrupt information generator 534 including the file stream analyzer 522, the interrupt setting unit 523 and the interrupt-stream generator 524. The resultant interrupted stream and interrupt information are stored in the storage unit 535 and the storage unit 536, respectively. The storage unit 535 and the storage unit 536 are formed in the image disk-0 (502) shown in FIG. 14.

If a request for an image having a file name of P1-20001031 is issued by the image viewer-2 (507), the image server 501 examines the contents of the storage unit 535. In this specific case, the interrupted stream of the image having the file name of P1-20001031 is found, and thus the interrupted stream stored in the storage unit 535 is transmitted to the image viewer-2 (507) without having to issue a request for the image to the external data center 513.

In the case where a request for a higher-quality version of the image displayed on the image viewer-2 (507) is issued, a partial image data stream, which is necessary to generate the requested higher-quality version of the image, is transmitted from the external data center 513 in a similar manner as described above.

It should be noted that in the case where the image viewer-2 (507) has capabilities similar to those of the image viewer-1 (505), interrupted streams stored in the storage unit 535 of the image server 501 are not basically used for those images that have been displayed on the image viewer-2 (507). However, an interrupted stream stored in the storage unit 535 of the image server 501 is used in two cases described below.

One case is when a request for an image is issued by an image viewer-4 that does not have capabilities similar to those of the image viewer-1 (505). The other case is that because of the limitation on the storage capacity of the storage unit of the image viewer-1 (505) or the image viewer-2 (507) relative to that of the image server 501, an interrupted stream stored in the storage unit of the image viewer-1 (505) or the image viewer-2 (507) was deleted earlier than a corresponding interrupted stream stored in the storage unit of the imager server 501. Note that when an interrupted stream is deleted, associated interrupt information is also deleted.

Now, the image viewer-3 (515) is described below. The image viewer-3 (515) has capabilities similar to those of the image viewer-1. However, the image viewer-3 (515) does not have a part corresponding to the image server 501 and is directly connected to the network 511 so that a request for an image is directly transmitted to the external data center 512.

In the first embodiment, as described above, an interrupted stream and associated interrupt information are cached. This result in a reduction in the amount of data transmitted over the network. This is useful in particular when images having large data sizes are dealt with via the network.

Although the processing capacity and the storage capacity of computers are being improved drastically, the low capacity of networks limits the overall processing capacity of computer systems. The present invention provides a good solution to such a problem.

More specifically, many computers having an image viewer for viewing an image have a storage with a very high storage capacity on the order of few terabytes. This allows a very large amount of information to be cached. Caching such a large amount of information makes it possible to reduce the amount of data transmitted over the network.

Although some conventional WEB viewers have a capability of storing a part of a complete image data, the data is not stored in the form of an interrupted stream generated on the basis of the content of the image.

In contrast, according to the present invention, an image data stream being inputted is analyzed on the basis of the bit planes, subbands and layers, and an interrupted stream is generated by intentionally interrupting the image data stream at a particular meaningful point of the image data stream with reference to a specified reference value of the compression ratio or the signal-to-noise ratio.

It is possible to form a useful image using only such an interrupted stream. When a request for a higher-quality version of the image is issued via a user interface of the image viewer, the required version of the image can be displayed by receiving only a part of the image data stream following the existing part of the image data stream. Thus, it is possible to reduce the amount of data transmitted via the network.

In the first embodiment described above, an interrupted stream is used to display an image on the image viewer-1 (505). Note that an interrupted stream according to the present invention can also be used for other purposes. For example, an interrupted stream can be used to print an image or transfer an image.

In the image viewer-1 (505) having functional blocks shown in FIG. 15, the file stream analyzer 522 may be implemented in the management computer 513 so that the management computer 513 can generate an interrupted stream and associated interrupt information in response to a request for an image issued by the image viewer-1 and so that the generated interrupted stream and the associated interrupt information are transmitted to the viewer-1.

SECOND EMBODIMENT

In a second embodiment, an interrupted stream is stored in a storage unit of a diagnostic scheduler 547 and written into an external device (such as a storage unit of an image viewer, an image server, or a storage device) connected via a network.

Figure 20:
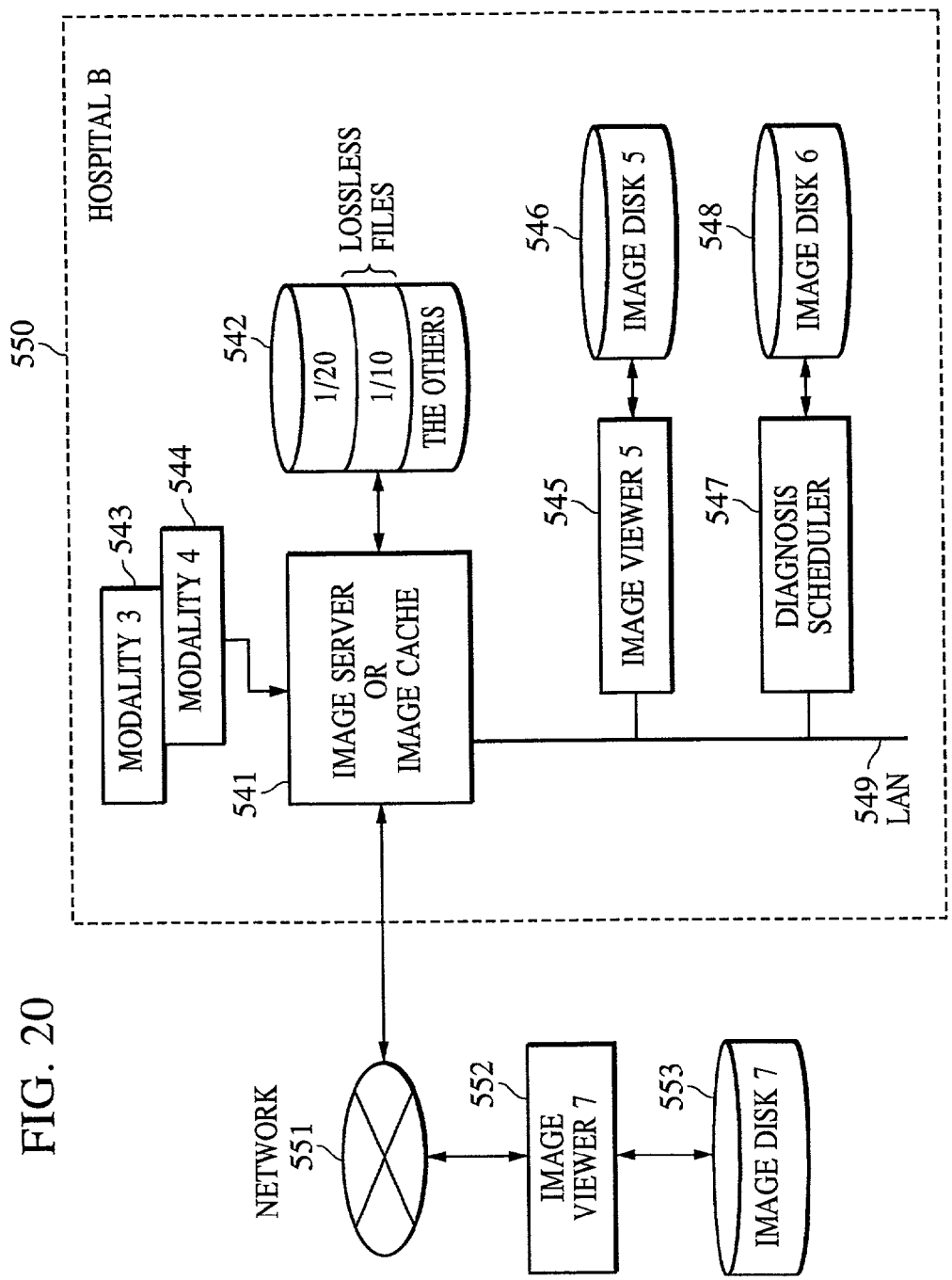
FIG. 20 is a block diagram of an image processing system according to a second embodiment of the present invention.

FIG. 20 a block diagram of an image processing system according to the second embodiment of the present invention.

In this image processing system according to the second embodiment of the present invention, a hospital B (550) and a terminal such as a personal computer having an image viewer-7 (552) are connected to each other via a network 551 such as the Internet.

In the hospital B (550), images such as medical images generated by a modality unit-3 (543) or a modality unit-4 (544) connected to an image server (or an image cache) 501 are stored in a storage unit 542 of the image server 501.

An image outputted from the modality unit-3 (543) or the modality unit-4 (544) to the image server 501 may have already been compression-coded by means of the DWT transformation described earlier or may not have been compression-coded.

In particular, when the image is transferred to the image server 501 without being compression-coded, the image server 501 performs compression coding on the received image, using a compression coding capability provided in the image server 501. The compression-coded image data is stored in the storage unit 542.

More specifically, the image data is stored in the form of a lossless coded image data file in the storage unit 542. In the case where images are stored in the form of lossless coded files, an image data stream stored in any image file can be decoded into an image that is absolutely identical in bit level to a corresponding original image.

The image data streams of image files stored in the storage unit 542 are organized in accordance with, for example, the compression ratio. In the example shown in FIG. 14, each image data stream includes parts corresponding to compression ratios of 1/20 and 1/10, respectively, and the remaining part, wherein those parts are stored separately in different storage areas.

Figure 21:
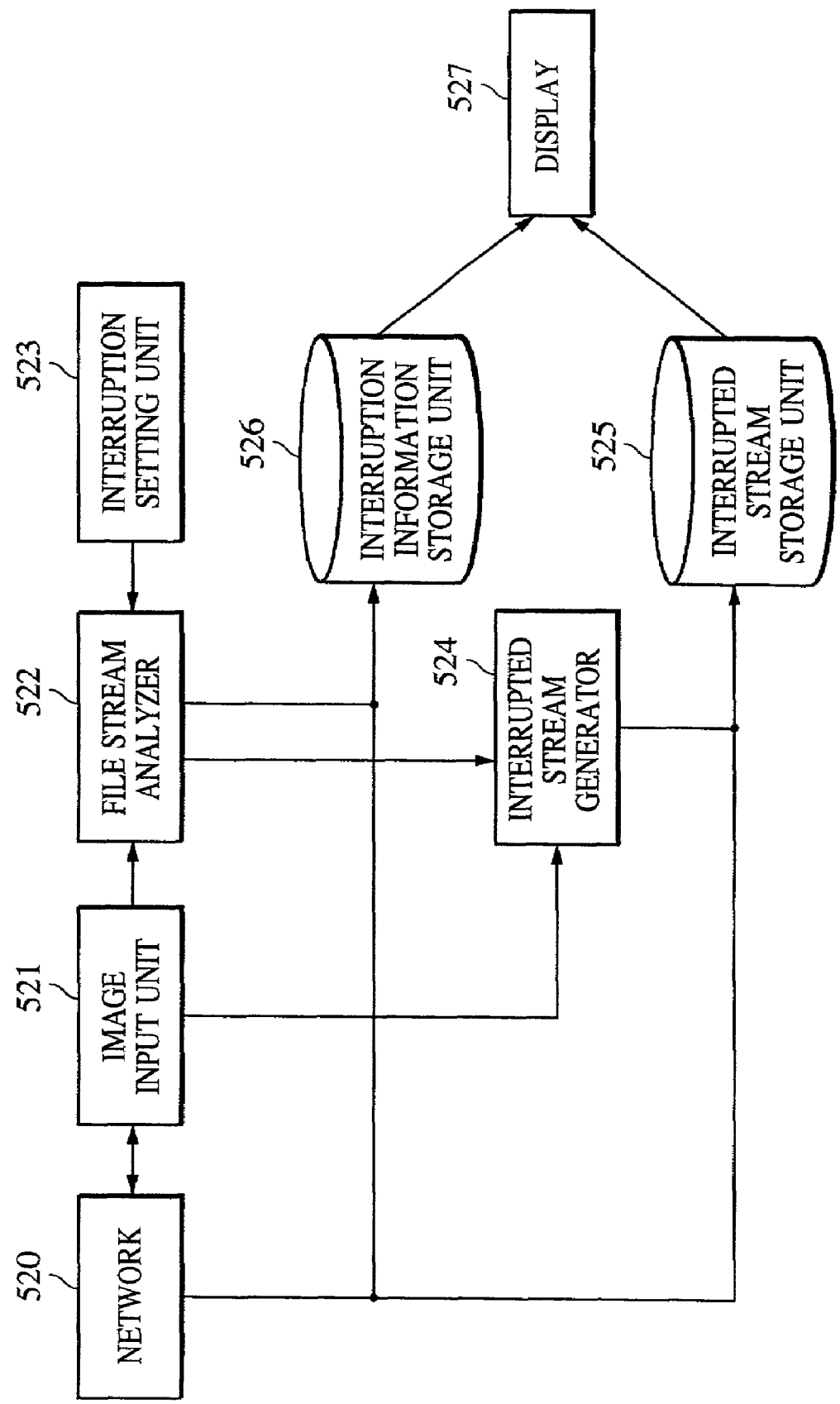
FIG. 21 is a functional block diagram of an image viewer according to the second embodiment of the present invention.

The image viewer-5 (545) has similar capabilities to the image viewer-1 (505). However, as shown in FIG. 21, the difference is that data inputted to the network unit 520 can be directly stored into the storage unit 525 and the storage unit 526.

The complete image viewer-5 (545) may be implemented on a computer. In this case, the image viewer-1 (505) may be modified so as to achieve the functions of the image viewer-5 (545) simply by modifying a program.

The above-described capability of the image viewer-5 (545) makes it possible for the image viewer-5 (545) to generate an interrupted stream and associated interrupt information and store them in the storage unit 525 and the storage unit 526, respectively. It is also possible to store an interrupted stream and associated interrupt information received from the outside, directly into the storage unit 525 and the storage unit 526, respectively.

Using of the diagnostic scheduler 547 makes it possible to quickly display an image used in a diagnosis performed by doctors in the hospital B (550) or is used in a remote diagnosis performed by doctors using the image viewer-7 (552). The quick displaying is achieved by a reduction in the transmission time needed to transmit an image via the LAN 549 or the network 551.

For example, let us assume that the image viewer-5 (545) is scheduled to display an image having a file name of P2-20001101 of a patient P2 stored in the storage unit 542 of the image server 541 so that a doctor D3 can use the displayed image for a diagnosis.

Before the scheduled time at which the diagnosis is to be performed, the diagnostic scheduler 547 reads the image having the file name of P2-20001101 from the image server 541, generates an interrupted stream and associated interrupt information in a similar manner as in the first embodiment, and stores them on the image disk-5 (546) of the image viewer-5 (545) so that when the image of P2-20001101 is actually displayed in response to a request issued by the doctor D3, it is possible to display the image in a short time without having to acquire the image data from the image server 541 via the LAN 549.

The functional configuration of the diagnostic schedule 547 is described below with reference to FIG. 22.

Figure 22:
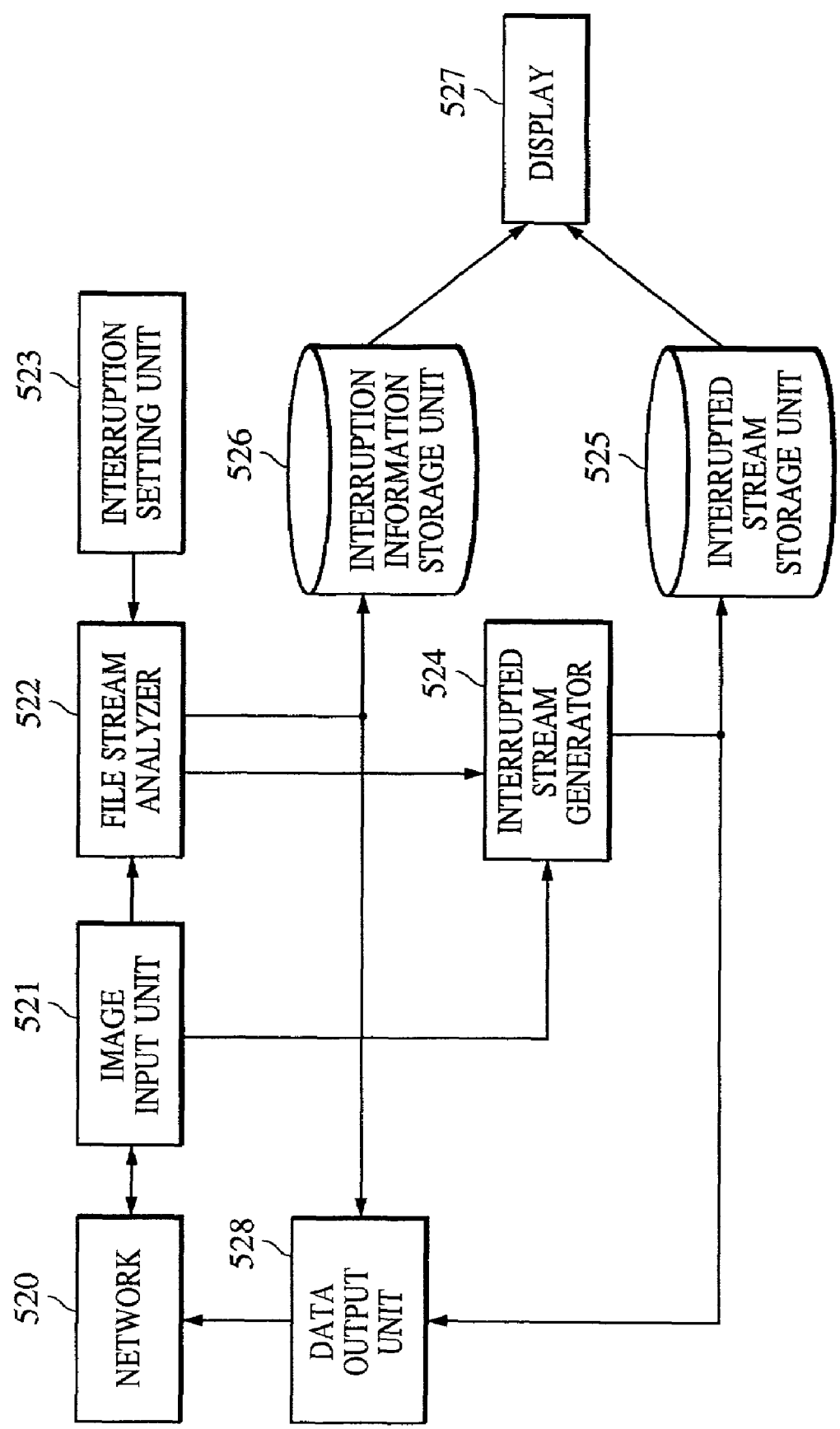
FIG. 22 is a functional block diagram of a diagnostic scheduler according to the second embodiment of the present invention.

FIG. 22 is a functional block diagram of the diagnostic scheduler according to the second embodiment of the present invention.

As shown in FIG. 22, the diagnostic scheduler 547 is configured by adding a data output unit 528 to the functional configuration of the image viewer-1 (505) shown in FIG. 15, and thus the similar parts to those of the image viewer-1 (505) are not described herein.

The diagnostic scheduler 547 generates an interrupted stream and associated interrupt information of an image (such as an image of P2-20001101) to be used in a diagnosis and stores them in the storage unit 525 and the storage unit 526, respectively.

Thereafter, the image output unit 528 reads the interrupted stream and the associated interrupt information from the storage unit 525 and the storage unit 526, respectively, and writes them into the storage unit 525 and the storage unit 526, respectively, provided in the image disk 546 of the image viewer-5 (545) that is scheduled to display the image.

When the doctor D3 issues a request for displaying the image having the file name of P2-20001101 for use in diagnosis, the interrupted stream and the associated information are read from the storage unit 525 and the storage unit 526, respectively, provided in the image disk of the image viewer-5 (545).

An image viewer-7 (552) for use in remote diagnosis also has capabilities similar to the image viewer-5 (545) so that a doctor can quickly start diagnosis using the image viewer-7 (552) without having to receive an image.

When a request for a higher quality version of the image is issued, only a partial data stream that is needed to display the higher quality version of the image is transmitted from the image server 541 in response to the request.

In addition to the advantages described above, the image processing system according to the second embodiment also has an advantage in terms of security. More specifically, interrupted streams transmitted from the computer installed in the hospital B (550) to the outside via the network 551 have an image quality lower than that of the corresponding original images. That is, original images, themselves are not transmitted to the outside.

When a request for a high quality version of an image is issued, the image server 541 transmits a partial image data stream following an interrupted stream to an issuer of the request. Therefore, the image server 541 never receives a request for a complete image data stream of an image from an external computer (such as the image viewer-7 (552)) connected to the image server 541 via the network 551.

That is, although the image server 541 is inhibited from transmitting a complete image data stream of an image at a time, the inhibition does not cause the image viewer-7 (552) to have any limitation in practical remote diagnosis.

As can be understood from the above description, in addition to the advantages similar to those obtained in the first embodiment, the second embodiment has additional advantages. That is, when data of an image to be used in remote diagnosis is transmitted via a network, the transmission of data is limited to a part of the complete image data having a smallest data size needed to display a lowest-quality image.

This allows a reduction in the amount of data transmitted via the network. Furthermore, transmission of only a necessary partial image data stream to the outside of a hospital ensures high security that prevents the complete original image data from being stolen.

The present invention has been described above with reference to the first and second embodiments in which an interrupted stream, which is a part of a complete original image data stream, is generated. Note that the present invention may also be applied to a data stream other than an image data stream. The present invention is useful in particular when a complete data stream has a large data size.

The present invention may be applied to various types of systems, which may include either a plurality of devices (such as a host computer, interfaces, a reader, a printer, etc.) or a single device (such as a copying machine or a facsimile machine).

Furthermore, the objects of the present invention may also be achieved by supplying a storage medium, on which a software program implementing the functions of any of the embodiments described above is stored, to a system or an apparatus, whereby a computer (CPU or MPU) in the system or apparatus reads and executes the program code stored on the storage medium.

In this case, it should be understood that the program code read from the storage medium implements the functions of the embodiments according to the present invention and thus the storage medium storing the program code falls within the scope of the present invention.

Specific examples of such a storage medium for storing the program code include a floppy disk, a hard disk, an optical disk, a magneto-optical disk, a CD-ROM, a CD-R/RW, a DVD-ROM/RAM, a magnetic tape, a non-volatile memory card, and a ROM.

Furthermore, the scope of the present invention includes not only such a system in which the functions of any embodiment described above are implemented simply by reading and executing a program code on a computer but also a system in which a part of or the whole of process instructed by the program code is performed using an OS (operating system) on the computer.

Furthermore, the scope of the present invention also includes a system in which a program code is transferred once from a storage medium into a memory provided in a function extension board inserted in a computer or provided in a function extension unit connected to the computer, and then a part of or the whole of process instructed by the program code is performed by a CPU, or the like, in the function extension board or the function extension unit, thereby implementing the functions of any embodiment described above.

When the present invention is practiced using such a storage medium, a program code corresponding to the flow chart shown in FIG. 17 is stored on the storage medium.

According to the present invention, as described above, a compressed image data is organized such that the amount of data transmitted via a network can be reduced.

In particular, if a hierarchical coding algorithm such as a wavelet transformation is employed, image data can be coded in a highly efficient fashion.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. An information processing apparatus for processing a data stream inputted via a network, comprising:
an input unit for inputting a data stream having hierarchically-encoded data via a network;
an interrupted-stream storage unit for storing an interrupted stream generated by interrupting the data stream;
an interrupt information storage unit for storing interrupt information associated with the interrupted stream;
an output unit for outputting the interrupted stream stored in said interrupted-stream storage unit, in response to a request for outputting the data stream,
wherein the interrupt information is at least one of: a compression ratio, a signal-to-noise ratio, and a number of layers of the data stream; and
a setting unit for setting or updating the interrupt information, wherein said output unit inputs a partial data stream following the interrupted stream via said input unit, in accordance with the interrupt information undated by said setting unit, and generates a previously presented interrupted stream from the interrupted stream stored in said interrupted-stream storage unit and the partial data stream.

2. An information processing apparatus according to claim 1, wherein said output unit inputs a partial data stream following said interrupted stream via the input unit.

3. An information processing apparatus according to claim 1, wherein said output unit outputs the interrupt information together with the interrupted stream.

4. An information processing apparatus according to claim 1, wherein the hierarchically-encoded data includes SNR-Scalable encoded data or resolution-scalable encoded data.

5. An information processing apparatus according to claim 1, wherein the input unit inputs a data stream received from a server via the network, and wherein the server stores the data stream as lossless encoded data.

6. A method of controlling an information processing apparatus for processing a data stream having hierarchically-encoded data inputted via a network, the method comprising:
an input step of inputting a data stream via a network;
an interrupted-stream storage step of storing, on a first storage medium, an interrupted stream generated by interrupting the data stream;
an interrupt information storage step of storing, on a second storage medium, the interrupt information associated with the interrupted stream;
an output step of outputting the interrupted stream stored on the first storage medium in the interrupted-stream storage step, in response to a request for outputting the data stream,
wherein the interrupt information is at least one of: a compression ratio, a signal-to-noise ratio, and a number of layers of the data stream; and
a setting step of setting or updating the interrupt information, wherein, in accordance with the interrupt information undated in said setting step, said output step includes inputting, via execution of said input step, a partial data stream following the interrupted stream and generating a previously presented interrupted stream from the partial data stream and the interrupted stream stored on the second storage medium in said interrupted-stream storing step.

7. A method for controlling an information processing apparatus according to claim 6, wherein said output step includes inputting a partial data stream following the interrupted stream, via the input step.

8. A computer-readable memory medium storing a program for implementing a method of controlling an information processing apparatus, the program comprising:
a program code of an input step of inputting a data stream having hierarchically-encoded data via a network;
a program code of an interrupted-stream storage step of storing, on a first storage medium, an interrupted stream generated by interrupting the data stream;
a program code of an interrupt information storage step of storing, on a second storage medium, the interrupt information associated with the interrupted stream;
a program code of an output step of outputting the interrupted stream stored on the first storage medium in the interrupted-stream storage step, in response to a request for outputting the data stream,
wherein the interrupt information is at least one of: a compression ratio, a signal-to-noise ratio, and a number of layers of the data stream; and
a program code of a setting step of setting or updating the interrupt information, wherein, in accordance with the interrupt information undated in said setting step, said output step includes inputting, via execution of said input step, a partial data stream following the interrupted stream and generating a previously presented interrupted stream from the partial data stream and the interrupted stream stored on the second storage medium in said interrupted-stream storing step.

9. An information processing apparatus for processing a data stream inputted via a network, comprising:
an input unit for inputting a data stream having hierarchically-encoded data via a network;
an analysis unit for analyzing the data stream inputted via said input unit;
a generating unit for, in accordance with an analysis result made by said analysis unit, interrupting input of the data stream via said input unit and generating an interrupted stream from the data stream;
an interrupted-stream storage unit for storing the interrupted stream generated by said generating unit;
an interrupt information storage unit for storing interrupt information associated with the interrupted stream;
an output unit for outputting the interrupted stream and the interrupt information to an external apparatus connected to the network,
wherein in the analysis, at least one of: a compression ratio, a signal-to-noise ratio, and a number of layers of the data stream is employed as an analysis condition; and
a setting unit for setting or updating the interrupt information, wherein said output unit inputs a partial data stream following the interrupted stream via said input unit, in accordance with the interrupt information undated by said setting unit, and generates a previously presented interrupted stream from the interrupted stream stored in said interrupted-stream storage unit and the partial data stream.

10. An information processing apparatus according to claim 9, wherein said setting unit sets or updates a reference value indicating the analysis condition of said analysis unit, wherein said analysis unit analyzes the data stream inputted via said input unit, with respect to the reference value.

11. A method of controlling an information processing apparatus for processing a data stream inputted via a network, the method comprising:

an input step of inputting a data stream having hierarchically-encoded data via a network;

an analysis step of analyzing the data stream inputted via said input step;

a generating step of, in accordance with an analysis result made in said analysis step, interrupting input of the data stream in said input step and generating an interrupted stream from the data stream;

an interrupted-stream storage step of storing, on a first storage medium, the interrupted stream generated in said generating step;

an interrupt information storage step of storing, on a second storage medium, the interrupt information associated with the interrupted stream;

an output step of outputting the interrupted stream and the interrupt information to an external apparatus connected to the network, wherein in the analysis, at least one of: a compression ratio, a signal-to-noise ratio, and a number of layers of the data stream is employed as an analysis condition; and a setting step of setting or updating the interrupt information, wherein, in accordance with the interrupt information updated in said setting step, said output step includes inputting, via execution of said input step, a partial data stream following the interrupted stream and generating a previously presented interrupted stream from the partial data stream and the interrupted stream stored on the second storage medium in said interrupted-stream storing step.

12. A method for controlling an information processing apparatus according to claim 11, wherein said setting step further comprises setting a reference value indicating said analysis condition in said analysis step, wherein said analysis step includes analyzing the data stream inputted via said input step, with respect to the reference value.

13. A computer-readable memory medium storing a program for implementing a method of controlling an information processing apparatus, the program comprising:

a program code of an input step of inputting a data stream having hierarchically-encoded data via a network;

a program code of an analysis step of analyzing the data stream inputted via the input step;

a program code of a generating step of, in accordance with an analysis result made in the analysis step, interrupting input of the data stream in the input step and generating an interrupted stream from the data stream;

a program code of an interrupted-stream storage step of storing, on a first storage medium, the interrupted stream generated in the generating step;

a program code of an interrupt information storage step of storing, on a second storage medium, the interrupt information associated with the interrupted stream;

a program code of an output step of outputting the interrupted stream and the interrupt information to an external apparatus connected to the network, wherein in the analysis, at least one of: a compression ratio, a signal-to-noise ratio, and a number of layers of the data stream is employed as an analysis condition; and a program code of a setting step of setting or updating the interrupt information, wherein, in accordance with the interrupt information undated in said setting step, said output step includes inputting, via execution of said input step, a partial data stream following the interrupted stream and generating a previously presented interrupted stream from the partial data stream and the interrupted stream stored on the second storage medium in said interrupted-stream storing step.

* * * * *